US012573366B2

(12) United States Patent
Naga et al.

(10) Patent No.: US 12,573,366 B2
(45) Date of Patent: Mar. 10, 2026

(54) METHOD AND APPARATUS FOR OCCUPANT-BASED NOISE CANCELLATION

(71) Applicant: Harman International Industries, Incorporated, Stamford, CT (US)

(72) Inventors: Prasanna Kumar Bolisetty Yeswanth Naga, Karnataka (IN); Xiaodong Yang, Aichi (JP)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 309 days.

(21) Appl. No.: 18/471,224

(22) Filed: Sep. 20, 2023

(65) Prior Publication Data

US 2025/0095627 A1     Mar. 20, 2025

(51) Int. Cl.
*G10K 11/178*      (2006.01)
*B60Q 9/00*      (2006.01)

(52) U.S. Cl.
CPC .......... *G10K 11/17823* (2018.01); *B60Q 9/00* (2013.01); *G10K 11/17873* (2018.01); *G10K 2210/1282* (2013.01); *G10K 2210/3027* (2013.01); *G10K 2210/3046* (2013.01); *G10K 2210/3056* (2013.01)

(58) Field of Classification Search
CPC ....... G10K 11/17823; G10K 11/17873; G10K 2210/1282; G10K 2210/3027; G10K 2210/3046; G10K 2210/3056; B60Q 9/00

USPC .......................................................... 381/71.4
See application file for complete search history.

(56) References Cited

U.S. PATENT DOCUMENTS

| | | | |
|---|---|---|---|
| 7,039,207 B1 * | 5/2006 | Elrod ................ | G10K 11/1783 |
| | | | 381/301 |
| 2002/0076059 A1 | 6/2002 | Joynes | |
| 2016/0086592 A1 * | 3/2016 | Saxman ............ | G10K 11/1785 |
| | | | 381/71.4 |
| 2020/0083856 A1 | 3/2020 | Tin Than et al. | |

OTHER PUBLICATIONS

European Patent Office, Extended European Search Report Issued in Application No. 24201326.6, Jan. 29, 2025, Germany, 8 pages.

* cited by examiner

*Primary Examiner* — Paul Kim
*Assistant Examiner* — Douglas J Suthers
(74) *Attorney, Agent, or Firm* — McCoy Russell LLP

(57) ABSTRACT

Described herein are methods and systems for a vehicle system which provide inbuilt noise cancellation in the vehicle and automatic detection of an auxiliary seat (e.g., an infant car seat) which may be positioned in the vehicle. In one or more embodiments, a method for controlling the noise cancelling system includes determining a presence of an auxiliary seat in a zone of a vehicle and, responsive to the presence of the auxiliary seat, activating a noise cancellation device to adjust a noise level in the vehicle zone.

19 Claims, 7 Drawing Sheets

METHOD AND APPARATUS FOR OCCUPANT-BASED NOISE CANCELLATION

FIELD

The disclosure relates to methods and apparatuses for an audio environment of a vehicle.

BACKGROUND

Vehicle audio systems typically include speakers that are distributed around the vehicle interior to provide sound. Premium vehicle audio systems often include large sub-woofers with dedicated amplifiers. A cabin of a vehicle may include multiple zones which may be occupied by users. Speakers of a vehicle audio system may be specific to a zone, or may be shared by more than one zones of the vehicle. For some users, such as children or infants, an auxiliary carrier (e.g., an infant car seat, a booster seat, and so on) may be positioned in a zone of the cabin of the vehicle to assist in positioning of the child or infant in the respective zone.

SUMMARY

A vehicle ecosystem includes a sound system, which provides an auditory experience, such as playing music, for occupants of the vehicle irrespective of the ages of occupants. For younger occupants whose ear canals may not be fully developed, such as children and infants, noise levels which are greater than 60 decibels may cause degradation of hearing efficiency, and potential eardrum rupture. Further, elder occupants (e.g., 65 years old and older) may be sensitive to noise levels above 65-70 decibels, where exposure to noise levels greater than 65-70 decibels may cause discomfort to an elder. On average, noise levels in the vehicle ecosystem exceed 75 decibels. Systems and methods for the vehicle system are desirable which enable occupants of the vehicle to participate in the auditory experience at a decibel level which is desirable for their respective age.

Described herein are methods and systems for a vehicle ecosystem which provides noise cancellation in a vehicle and/or an auxiliary carrier (e.g., an infant car seat) which may be positioned in the vehicle. A method for user-based noise cancellation comprises detecting a presence and an age of a user, determining an environmental sound level, and, in response to the presence of the user and determination that the environmental sound level exceeds a sound level threshold for the user's age, outputting a sound via speakers to at least partially reduce the environmental sound level. Specifically, when implemented in the vehicle of the vehicle ecosystem, a method includes detecting a zone of the vehicle in which the user and/or the auxiliary carrier is positioned, and outputting sound via one or more speakers of the vehicle depending on the zone in which the user and/or the auxiliary carrier is positioned. The auxiliary carrier may be positioned in the vehicle, may be moving into or out of the vehicle, or may be positioned outside the vehicle. A method executed by an auxiliary carrier of the vehicle system comprises outputting sound via speakers of the auxiliary carrier positioned in a first zone of a vehicle to at least partially reduce an environmental sound level when the environmental sound level exceeds a first sound level threshold, and outputting sound via speakers of a second zone of the vehicle to at least partially reduce the environmental sound level when the auxiliary carrier is positioned in the second zone of the vehicle and the environmental sound level exceeds a second sound level threshold. A method for user-based noise cancellation may further include detecting a position of the auxiliary carrier with respect to the vehicle and, depending on the position of the auxiliary carrier, output sound via speakers of the vehicle or speakers of the auxiliary carrier to at least partially reduce the environmental sound level. The method further includes reducing the environmental sound level to a first level when the age of the user is within a first age range and reducing the environmental sound level to a second level, different from the first level, when the age of the user is within a second age range different from the first age range.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

The following description relates to systems and methods for user-based noise cancellation in a vehicle system, and in particular, activation of noise cancellation in a zone of a cabin of a vehicle and/or in an auxiliary carrier in response to detection of a user presence in the respective zone, an age of the user being within an age range which is sensitive to noise (e.g., infant or elder), and an environmental sound level exceeding a sound level threshold for the respective age range. In some embodiments, the environmental sound level may include audio output by speakers of the vehicle and, in other embodiments, the environmental sound level may additionally or alternatively include ambient noise, such as talking, notification sounds, vehicle operation noises, and so on. In this way, a sound volume (e.g., an environmental sound level) around an infant or an elder may be automatically reduced, which may reduce degradation of the occupying infant or elder's hearing ability and/or user discomfort due to excessive volume levels. Noise levels in other vehicle zones of the vehicle (e.g., other vehicle seats) may be unaffected by noise cancellation, allowing other occupants of the vehicle to continue to listen to audio at desired levels. The methods and systems described herein may further reduce degradation of speakers of the vehicle and/or the auxiliary carrier, as some but not all speakers of the respective systems may be used for noise cancellation.

Figure 1:
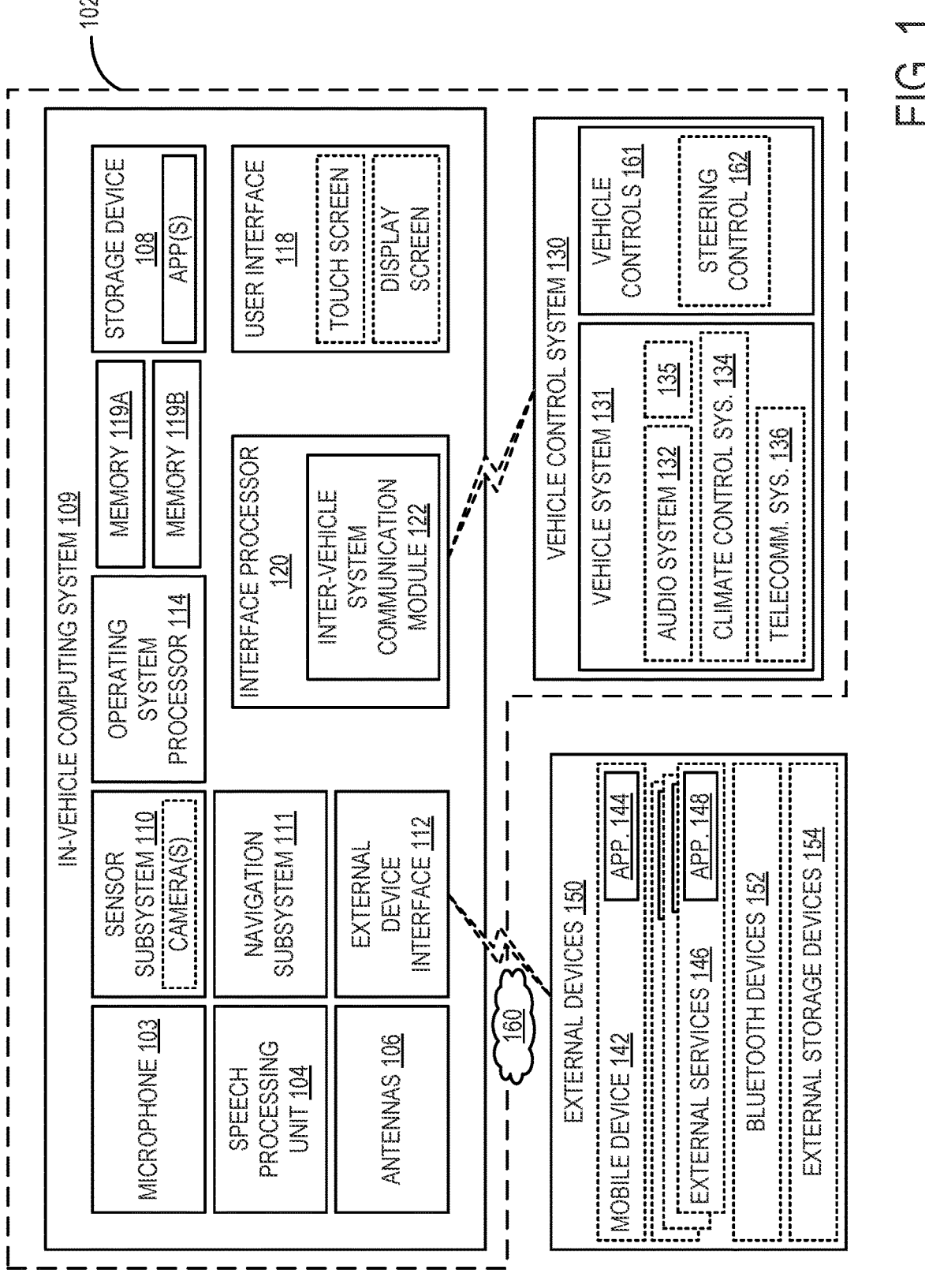
FIG. 1 shows a block diagram of an in-vehicle computing system and one or more external devices.
Figure 2:
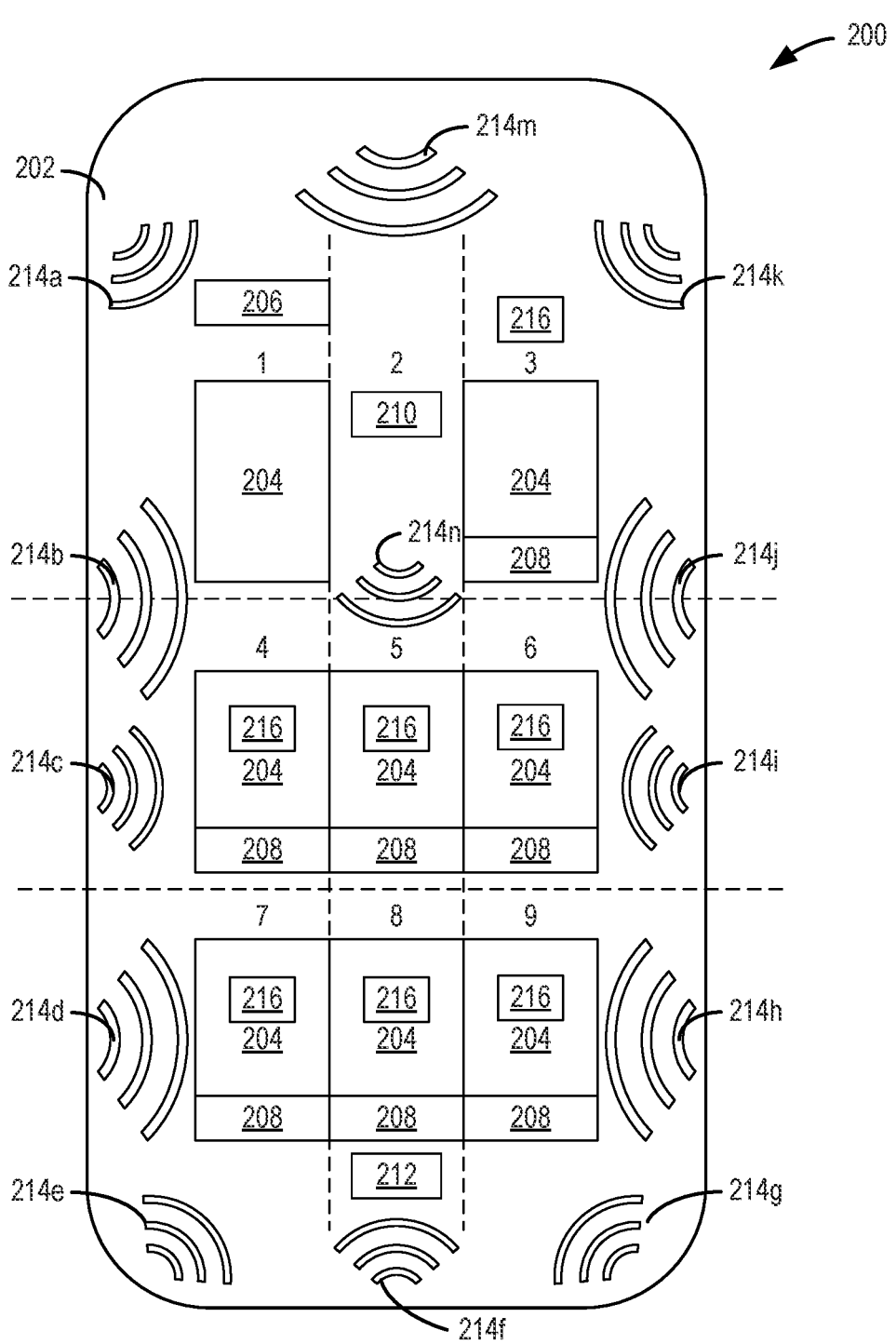
FIG. 2 shows a schematic of a cabin of a vehicle, divided into zones.
Figure 3:
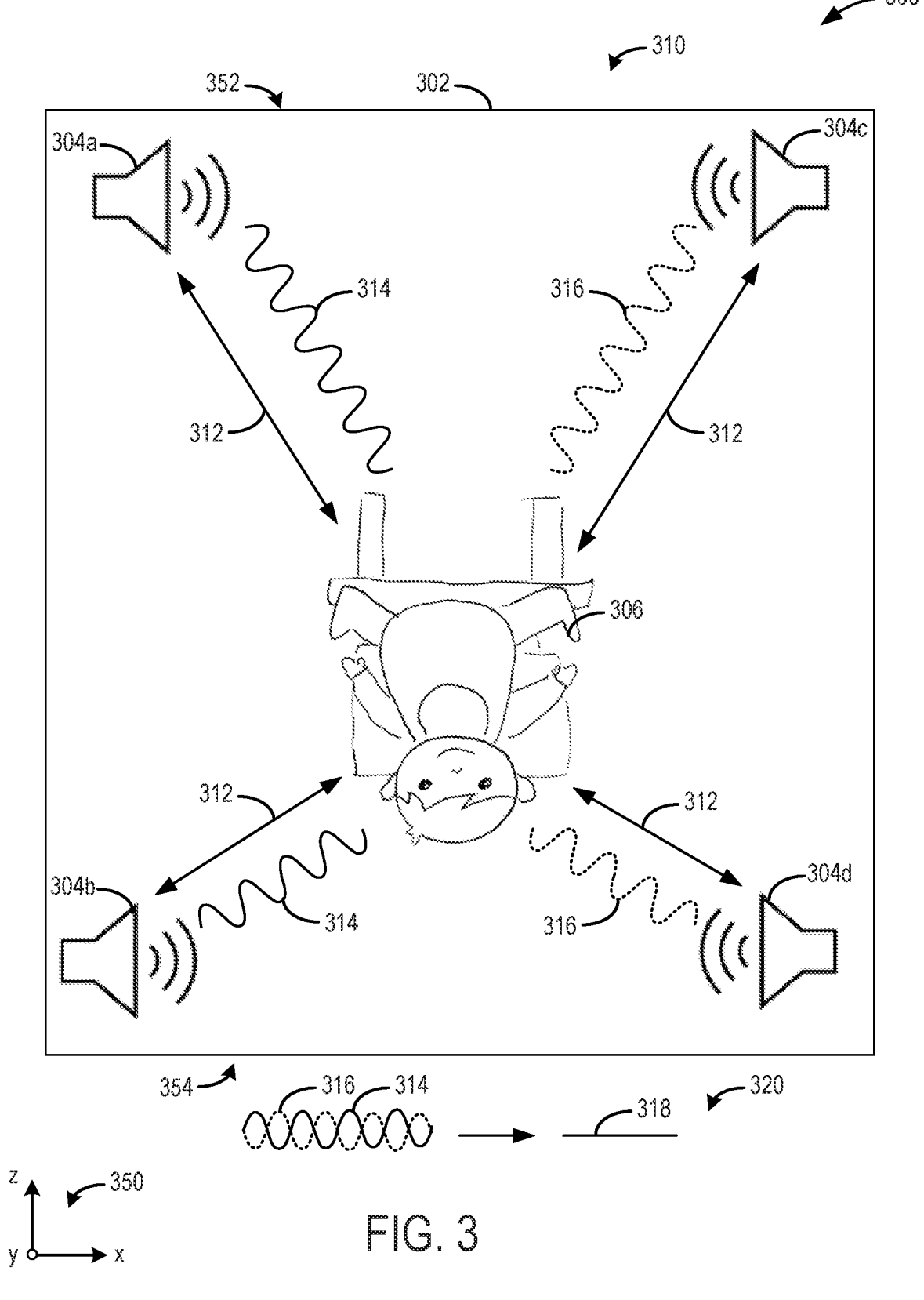
FIG. 3 shows an illustration of noise cancellation by speakers of a vehicle.
Figure 4:
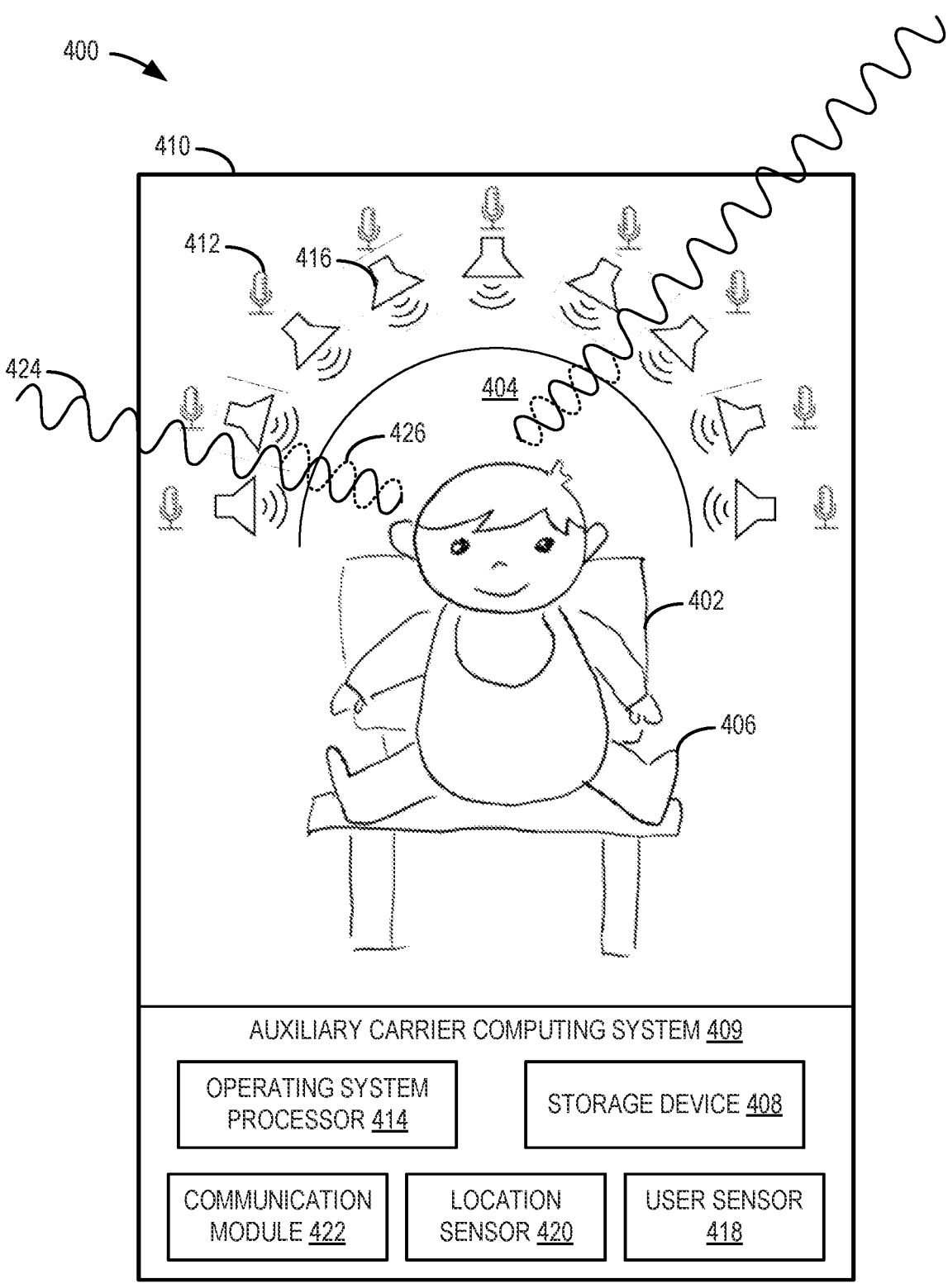
FIG. 4 shows an illustration of noise cancellation by speakers of an auxiliary carrier.
Figure 5A:
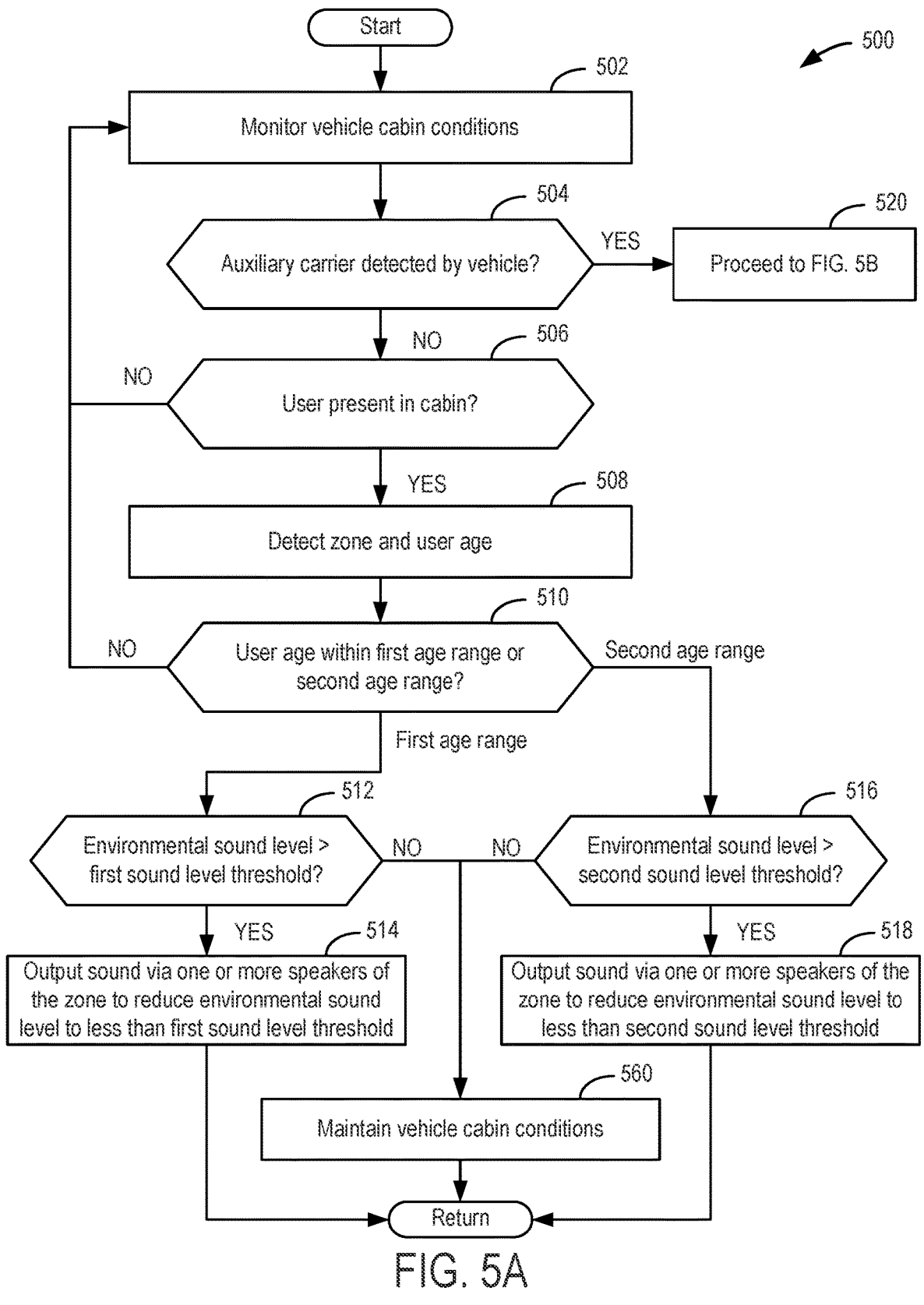
FIGS. 5A, 5B, and 5C show a flow chart for a method for adjusting noise cancellation within a vehicle system which includes a vehicle and an auxiliary carrier.
Figure 5B:
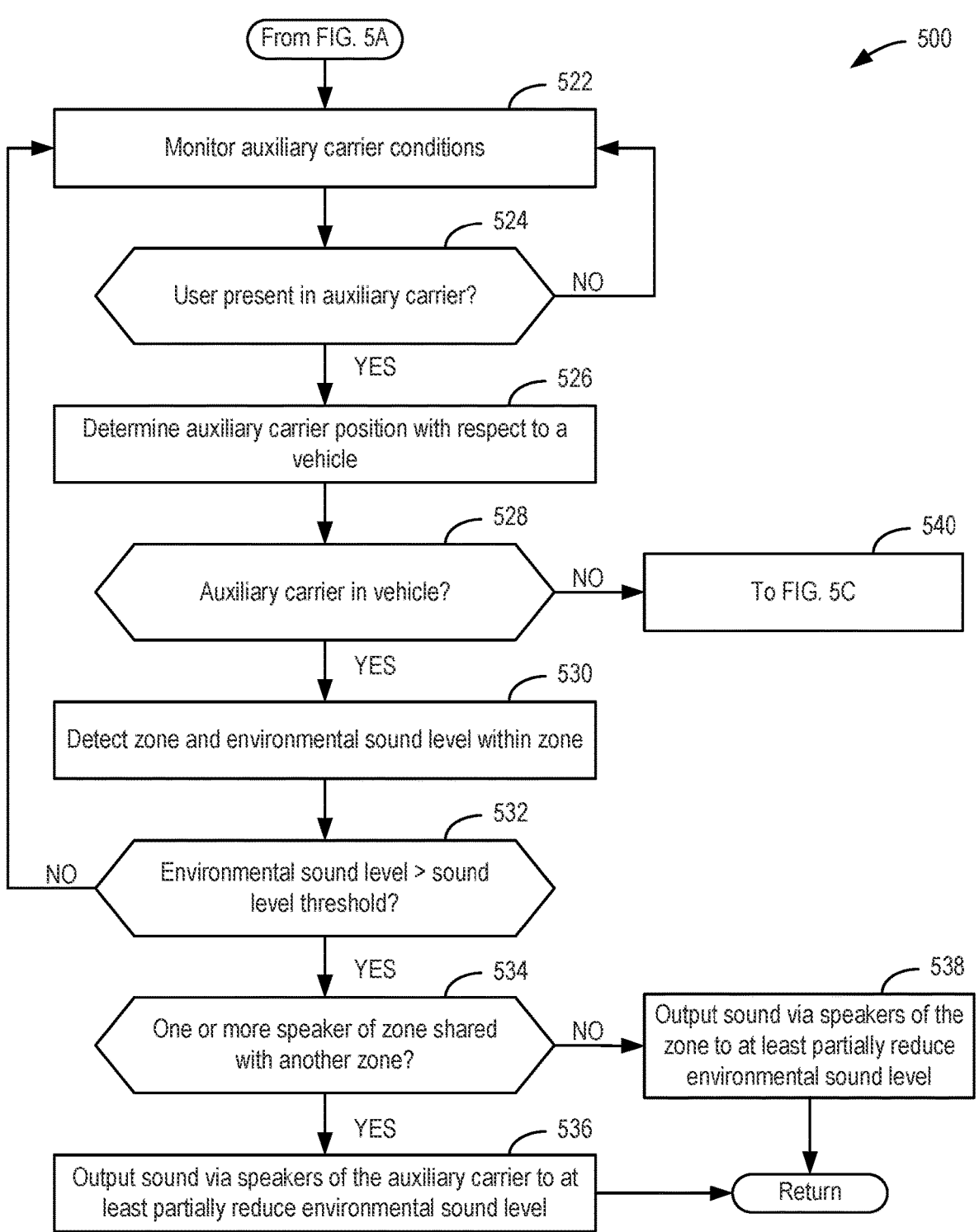
Figure 5C:
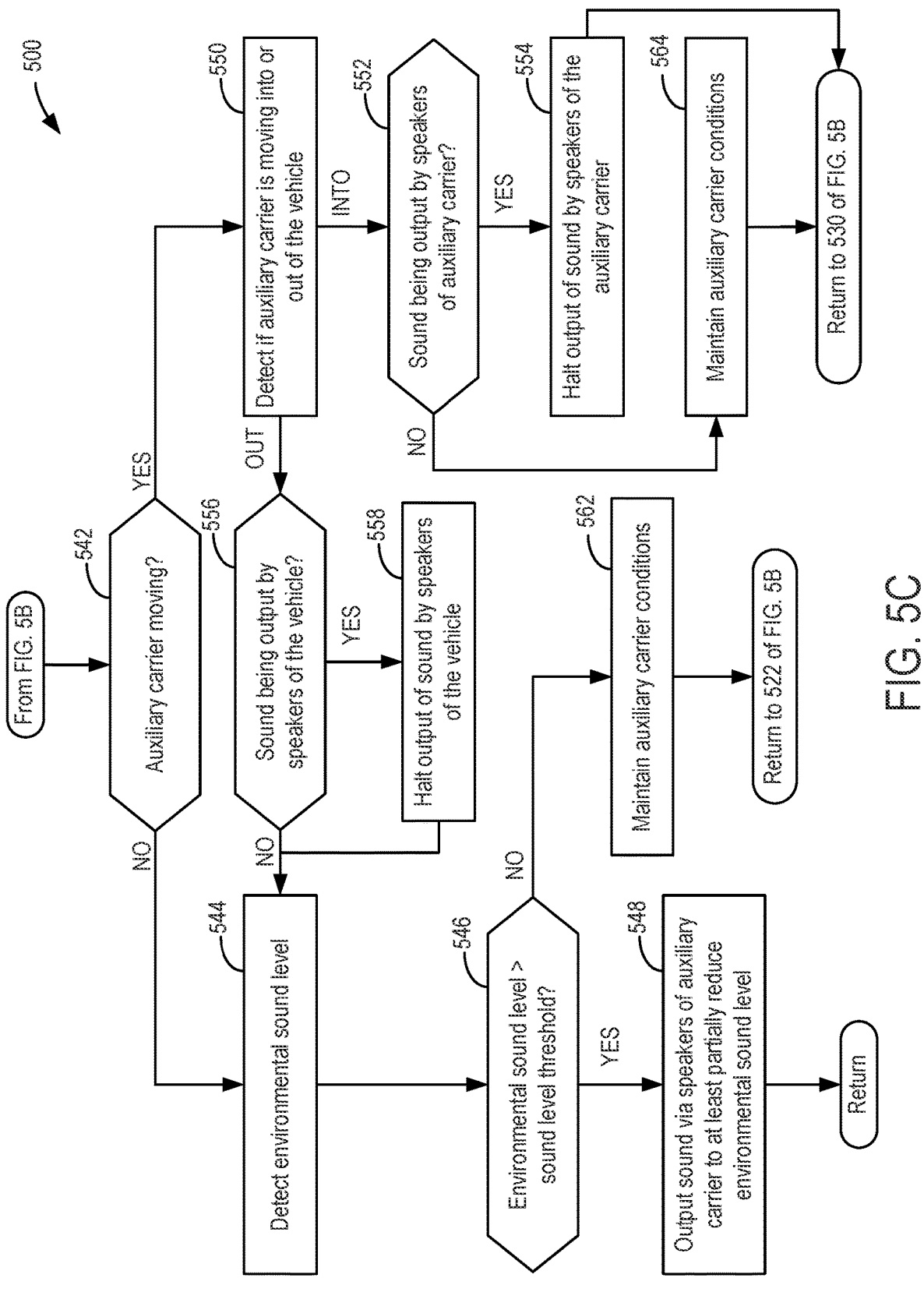

FIG. 1 illustrates an example in-vehicle computing system of a vehicle, where the in-vehicle computing system may include and/or be communicably coupled to elements of the vehicle and an auxiliary carrier (e.g., infant car seat, child booster seat). FIG. 2 illustrates an arrangement of vehicle zones within a cabin of a vehicle, which may be the vehicle of FIG. 1. FIG. 3 shows an illustration of noise cancellation by speakers of a zone of a vehicle (e.g., the vehicle of FIGS. 1-2). FIG. 4 shows an illustration of noise cancellation by speakers of an auxiliary carrier which may by, for example, positioned in the vehicle, transitioning into or out of the vehicle, or positioned outside of the vehicle. FIGS. 5A, 5B, and 5C show a flow chart for a method for adjusting noise cancellation within a vehicle system, the vehicle system including the auxiliary carrier of FIG. 4 and the vehicle of FIGS. 1-3. Briefly, the method described with respect to FIGS. 5A-5C illustrates different ways to perform noise cancellation in response to the user being positioned in different zones of the vehicle, in response to an age of the user, and in response to a presence of and/or a position of an auxiliary carrier with respect to the vehicle.

FIG. 1 shows a block diagram of an in-vehicle computing system 109 configured and/or integrated inside a vehicle 102. In-vehicle computing system 109 may perform one or more of the methods described herein in some embodiments. In some examples, in-vehicle computing system 109 may be a vehicle infotainment system configured to provide information-based media content (audio and/or visual media content, including entertainment content, navigational services, and so on) to a vehicle user to enhance the operator's in-vehicle experience. In-vehicle computing system 109 may include, or be coupled to, various vehicle systems, sub-systems, hardware components, as well as software applications and systems that are integrated in, or integratable into, vehicle 102 in order to enhance an in-vehicle experience for a driver and/or a passenger. In-vehicle computing system 109 may further be coupled to elements of an auxiliary carrier, as further described with respect to FIG. 4.

In-vehicle computing system 109 may include one or more processors including an operating system processor 114 and an interface processor 120. Operating system processor 114 may execute an operating system on in-vehicle computing system 109, and control input/output, display, playback, and other operations of in-vehicle computing system 109. Interface processor 120 may interface with a vehicle control system 130 via an inter-vehicle system communication module 122.

Inter-vehicle system communication module 122 may output data to one or more other vehicle systems 131 and/or one or more other vehicle control elements 161, while also receiving data input from other vehicle systems 131 and other vehicle control elements 161, e.g., by way of vehicle control system 130. When outputting data, inter-vehicle system communication module 122 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System (GPS) sensors, and so on), digital signals propagated through vehicle data networks (such as an engine controller area network (CAN) bus through which engine related information may be communicated, a climate control CAN bus through which climate control related information may be communicated, and a multimedia data network through which multimedia data is communicated between multimedia components in the vehicle). For example, in-vehicle computing system 109 may retrieve from the engine CAN bus the current speed of the vehicle estimated by the wheel sensors, a power state of the vehicle via a battery and/or power distribution system of the vehicle, an ignition state of the vehicle, and so on. In addition, other interfacing means such as Ethernet may be used as well without departing from the scope of this disclosure.

A storage device 108 may be included in in-vehicle computing system 109 to store data such as instructions executable by operating system processor 114 and/or interface processor 120 in non-volatile form. Storage device 108 may store application data, including prerecorded sounds, to enable in-vehicle computing system 109 to run an application for connecting to a cloud-based server and/or collecting information for transmission to the cloud-based server. The application may retrieve information gathered by vehicle systems/sensors, input devices (e.g., a user interface 118), data stored in one or more storage devices, such as a volatile memory 119A or a non-volatile memory 119B, devices in communication with the in-vehicle computing system (e.g., a mobile device connected via a Bluetooth® link), and so on. (Bluetooth® is a registered trademark of Bluetooth SIG, Inc., Kirkland, WA.) In-vehicle computing system 109 may further include a volatile memory 119A. Volatile memory 119A may be random access memory (RAM). Non-transitory storage devices, such as non-volatile storage device 108 and/or non-volatile memory 119B, may store instructions and/or code that, when executed by a processor (e.g., operating system processor 114 and/or interface processor 120), controls in-vehicle computing system 109 to perform one or more of the actions described in the disclosure.

A microphone 103 may be included in in-vehicle computing system 109 to receive voice commands from a user, to measure ambient noise in the vehicle, to determine whether audio from speakers of the vehicle is tuned in accordance with an acoustic environment of the vehicle, and so on. A speech processing unit 104 may process voice commands, such as the voice commands received from microphone 103. In some embodiments, in-vehicle computing system 109 may also be able to receive voice commands and sample ambient vehicle noise using a microphone included in an audio system 132 of the vehicle. As further described with respect to FIGS. 2-3, a cabin of the vehicle may include more than one microphone 103. Briefly, the cabin may be divided into multiple zones, and each zone of the multiple zones may have a microphone positioned therein to measure ambient noise within the respective zone.

One or more additional sensors may be included in a sensor subsystem 110 of in-vehicle computing system 109. For example, sensor subsystem 110 may include a camera, such as a rear view camera for assisting a user in parking the vehicle and/or a cabin camera for identifying a user (e.g., using facial recognition and/or user gestures). As further described herein, the cabin camera may be used to detect a relative age of a user. Sensor subsystem 110 may further include one or more pressure sensors and/or attachment sensors, for example, in one or more zones of the cabin to detect a presence of a user within the respective zone. In some embodiments, the sensor subsystem 110 includes an auxiliary carrier sensor, for example, integrated in a zone of the cabin of the vehicle and configured to detect positioning and/or coupling of an auxiliary carrier in the zone. Sensor subsystem 110 of in-vehicle computing system 109 may communicate with and receive inputs from various vehicle sensors and may further receive user inputs. For example, the inputs received by sensor subsystem 110 may include transmission gear position, transmission clutch position, gas pedal input, brake input, transmission selector position, vehicle speed, engine speed, mass airflow through the engine, ambient temperature, intake air temperature, and so on, as well as inputs from climate control system sensors, an audio sensor detecting voice commands issued by a user, a fob sensor receiving commands from and optionally tracking the geographic location/proximity of a fob of the vehicle, and so on.

While certain vehicle system sensors may communicate with sensor subsystem 110 alone, other sensors may communicate with both sensor subsystem 110 and vehicle control system 130, or may communicate with sensor subsystem 110 indirectly via vehicle control system 130. A navigation subsystem 111 of in-vehicle computing system 109 may generate and/or receive navigation information such as location information (e.g., via a GPS sensor and/or other sensors from sensor subsystem 110), route guidance, traffic information, point-of-interest (POI) identification, and/or provide other navigational services for the driver.

An external device interface 112 of in-vehicle computing system 109 may be coupleable to and/or communicate with one or more external devices 150 located external to vehicle 102. For example, in some embodiments an auxiliary carrier may include an auxiliary carrier controller, including a processor and a memory. The external device interface 112 may enable communication among the in-vehicle computing system 109 and the carrier controller, as further described herein with respect to FIG. 4. While the external devices are illustrated as being located external to vehicle 102, it is to be understood that they may be temporarily housed in vehicle 102, such as when the user is operating the external devices while operating vehicle 102, or when the auxiliary carrier is positioned in the cabin of the vehicle. In other words, external devices 150 are not integral to vehicle 102. External devices 150 may include a mobile device 142 (e.g., connected via a Bluetooth®, NFC, WI-FI Direct®, or other wireless connection) or an alternate Bluetooth®-enabled device 152. (Wi-Fi Direct® is a registered trademark of Wi-Fi Alliance, Austin, Texas).

Mobile device 142 may be a mobile phone, smart phone, wearable devices/sensors that may communicate with the in-vehicle computing system via wired and/or wireless communication, or other portable electronic device(s). Other external devices include one or more external services 146. For example, the external devices may include extra-vehicular devices that are separate from and located externally to the vehicle. Still other external devices include one or more external storage devices 154, such as solid-state drives, pen drives, Universal Serial Bus (USB) drives, and so on. External devices 150 may communicate with in-vehicle computing system 109 either wirelessly or via connectors without departing from the scope of this disclosure. For example, external devices 150 may communicate with in-vehicle computing system 109 through external device interface 112 over a network 160, a USB connection, a direct wired connection, a direct wireless connection, and/or other communication link.

External device interface 112 may provide a communication interface to enable the in-vehicle computing system to communicate with mobile devices associated with contacts of the driver. For example, external device interface 112 may enable phone calls to be established and/or text messages (e.g., Short Message Service (SMS), Multimedia Message Service (MMS), and so on) to be sent (e.g., via a cellular communications network) to a mobile device associated with a contact of the driver. External device interface 112 may additionally or alternatively provide a wireless communication interface to enable the in-vehicle computing system to synchronize data with one or more devices in the vehicle (e.g., the driver's mobile device) via Wi-Fi Direct®, as described in more detail below.

One or more applications 144 may be operable on mobile device 142. As an example, a mobile device application 144 may be operated to aggregate user data regarding interactions of the user with the mobile device. For example, mobile device application 144 may aggregate data regarding music playlists listened to by the user on the mobile device, telephone call logs (including a frequency and duration of telephone calls accepted by the user), positional information including locations frequented by the user and an amount of time spent at each location, and so on. The collected data may be transferred by application 144 to external device interface 112 over network 160. In addition, specific user data requests may be received at mobile device 142 from in-vehicle computing system 109 via external device interface 112. The specific data requests may include requests for determining where the user is geographically located, an ambient noise level and/or music genre at the user's location, an ambient weather condition (temperature, humidity, and so on) at the user's location, and so on. Mobile device application 144 may send control instructions to components (e.g., microphone, amplifier, and so on) or other applications (e.g., navigational applications) of mobile device 142 to enable the requested data to be collected on the mobile device or requested adjustment made to the components. Mobile device application 144 may then relay the collected information back to in-vehicle computing system 109.

Likewise, one or more applications 148 may be operable on external services 146. As an example, external services applications 148 may be operated to aggregate and/or analyze data from multiple data sources. For example, external services applications 148 may aggregate data from one or more social media accounts of the user, data from the in-vehicle computing system (e.g., sensor data, log files, user input, and so on), data from an internet query (e.g., weather data, POI data), and so on. The collected data may be transmitted to another device and/or analyzed by the application to determine a context of the driver, vehicle, and environment and perform an action based on the context (e.g., requesting/sending data to other devices).

Vehicle control system 130 may include controls for controlling aspects of various vehicle systems 131 involved in different in-vehicle functions. These may include, for example, controlling aspects of vehicle audio system 132 for providing audio entertainment to the vehicle occupants, aspects of a climate control system 134 for meeting the cabin cooling or heating needs of the vehicle occupants, as well as aspects of a telecommunication system 136 for enabling vehicle occupants to establish telecommunication linkage with others.

Audio system 132 may include one or more acoustic reproduction devices including electromagnetic transducers such as one or more speakers 135. Vehicle audio system 132 may be passive or active such as by including a power amplifier. In some examples, in-vehicle computing system 109 may be a sole audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies. As further described with respect to FIG. 2, a cabin of a vehicle (e.g., the vehicle 102) may be divided into different zones. Each zone may have a dedicated set of one or more speakers 135 positioned therein which produce audio output for the respective zone. Additionally or alternatively, one or more speakers 135 of the audio system 132 may be shared by two or more zones, for example, by being placed between zones and producing an audio output for both of the zones.

Vehicle control system 130 may also include controls for adjusting the settings of various vehicle control elements 161 (or vehicle controls, or vehicle system control elements) related to the engine and/or auxiliary elements within a cabin of the vehicle, such as one or more steering wheel controls 162 (e.g., steering wheel-mounted audio system controls, cruise controls, windshield wiper controls, headlight controls, turn signal controls, and so on), instrument panel controls, microphone(s), accelerator/brake/clutch pedals, a gear shift, door/window controls positioned in a driver or passenger door, seat controls, cabin light controls, audio system controls, cabin temperature controls, and so on. Vehicle control elements 161 may also include internal engine and vehicle operation controls (e.g., engine controller module, actuators, valves, and so on) that are configured to receive instructions via the CAN bus of the vehicle to change operation of one or more of the engine, exhaust system, transmission, and/or other vehicle system. The control signals may also control audio output at one or more speakers 135 of vehicle audio system 132. For example, the control signals may adjust audio output characteristics such as volume, equalization, audio image (e.g., the configuration of the audio signals to produce audio output that appears to a user to originate from one or more defined locations), audio distribution among a plurality of speakers, and so on. For example, as further described herein with respect to FIGS. 2-5B, audio output characteristics of a zone of the vehicle may be adjusted in response to determination that a user which is within a predetermined age range (e.g., infant or elder) is positioned in the zone of the vehicle. Likewise, the control signals may control vents, air conditioner, and/or heater of climate control system 134. For example, the control signals may increase delivery of cooled air to a specific section of the cabin.

Control elements positioned on an outside of a vehicle (e.g., controls for a security system) may also be connected to in-vehicle computing system 109, such as via inter-vehicle system communication module 122. The control elements of vehicle control system 130 may be physically and permanently positioned on and/or in the vehicle for receiving user input. In addition to receiving control instructions from in-vehicle computing system 109, vehicle control system 130 may also receive input from one or more external devices 150 operated by the user, such as from mobile device 142. This allows aspects of vehicle systems 131 and vehicle control elements 161 to be controlled based on user input received from external devices 150.

In-vehicle computing system 109 may further include one or more antennas 106. The in-vehicle computing system may obtain broadband wireless internet access via antennas 106, and may further receive broadcast signals such as radio, television, weather, traffic, and the like. In-vehicle computing system 109 may receive positioning signals such as GPS signals via antennas 106. The in-vehicle computing system may also receive wireless commands via radio frequency (RF) such as via antennas 106 or via infrared or other means through appropriate receiving devices. In some embodiments, antenna 106 may be included as part of audio system 132 or telecommunication system 136. Additionally, antenna 106 may provide AM/FM radio signals to external devices 150 (such as to mobile device 142) via external device interface 112.

One or more elements of in-vehicle computing system 109 may be controlled by a user via user interface 118. User interface 118 may include a graphical user interface presented on a touch screen and/or display screen, and/or user-actuated buttons, switches, knobs, dials, sliders, and so on. For example, user-actuated elements may include steering wheel controls, door and/or window controls, instrument panel controls, audio system settings, climate control system settings, and the like. A user may also interact with one or more applications of in-vehicle computing system 109 and mobile device 142 via user interface 118. In addition to receiving a user's vehicle setting preferences on user interface 118, vehicle settings selected by in-vehicle control system 130 may be displayed to a user on user interface 118. Notifications and other messages (e.g., received messages), as well as navigational assistance, may be displayed to the user on a display of the user interface. User preferences/information and/or responses to presented messages may be performed via user input to the user interface.

FIG. 2 shows a schematic of a cabin 202 of a vehicle 200 divided into multiple zones. The vehicle 200 may be an example of the vehicle 102 of FIG. 1, and thus includes elements of the in-vehicle computing system 109 and may be coupleable to and/or able to communicate with one or more external devices 150 (e.g., an auxiliary carrier, as further described with respect to FIG. 4). Each zone of the multiple zones of the cabin 202 is numbered as shown in FIG. 2 (e.g., zone 1, zone 2, zone 3, zone 4, zone 5, zone 6, zone 7, zone 8, and zone 9). Other embodiments of the vehicle 200 may include more or fewer zones than are shown in FIG. 2, and a number of zones may be dependent on a size and shape of the vehicle. In some embodiments, each of the zones includes a seat 204 or other area in which a user may be positioned when the vehicle is stationary or driving. In other embodiments, some but not all of the multiple zones may include a seat or area where a user may be positioned. For example, zone 2 as shown in FIG. 2 may include a gear shift, a storage compartment, an armrest, or another structure which is not intended to receive a user. A respective number or other identifier of each zone, as well as information about wherein the cabin 202 the zone is, may be stored in a memory of the vehicle (e.g., a volatile memory 119A or a non-volatile memory 119B). For example, zone 1 may be a zone of the vehicle which includes drive controls 206 (e.g., steering wheel controls, instrument panel controls, accelerator/brake/clutch pedals, a gear shift, and so on) which may be actuated by a user to control driving of the vehicle.

As briefly described with respect to FIG. 1, zones of the cabin of the vehicle may include sensors of the sensor subsystem 110. A user sensor 208 positioned in and/or used by one or more zones of the cabin may be configured to detect a presence of a user in the respective zone and, in some instances, detect a relative age of the user. In further embodiments, the user sensor 208 may detect a presence of an auxiliary carrier in addition to detecting a presence of a user in the auxiliary carrier. In some embodiments, a user sensor may be used for one or more of the multiple zones. Each zone may include one, multiple, or none of the example user sensors described herein. For example, zone 4, zone 5, and zone 6 may each include the same or a different type of user sensor configured to detect a presence of a user. The user sensor 208 may be a pressure sensor and/or an attachment sensor configured to detect a presence of a user within a respective zone. The pressure sensor may be configured to detect the presence of the user based on a weight deviation (e.g., a weight deviation greater than a positive, non-zero weight deviation threshold may indicate presence of a user in the respective zone). The attachment sensor may detect engagement of a seat belt, clip, or other attachment device which assists in positioning a user and/or an auxiliary carrier in a zone of the cabin 202. The pressure sensor, the seatbelt or other attachment sensor, or another type of user sensor may further be used to detect a presence of an auxiliary carrier, such as an infant car seat, as further described herein with respect to FIGS. 4-5B. In another example, a user sensor may be a cabin camera 210, for example positioned in zone 2, and used to identify users in any of zones 1-9. A second, similarly configured cabin camera 212 may be positioned in zone 8 to identify users in any of zones 1-9 from a different angle than the cabin camera 210. As further described herein, the cabin cameras may be used to detect a relative age of a user, as well as the presence of the user. In some embodiments, user sensors configured to be used in a method for noise cancellation (e.g., as described with respect to FIGS. 3-5C) may be integrated in each of the zones (e.g., each vehicle seat). In other embodiments, the noise cancellation system may be integrated in some of the zones, such as in zones 4, 5, and 6. One or more zones of the cabin 202 may further include an environmental sound sensor 216, such as a microphone configured to detect environmental sound levels within the respective zone.

The cabin 202 of the vehicle 200 may comprise multiple acoustic reproduction devices including electromagnetic transducers, such as one or more speakers (e.g., speakers 135 of FIG. 1). Each zone may have a one or more speakers positioned therein which produce audio output dedicated to the respective zone. Additionally or alternatively, one or more speakers may be shared by two or more zones, for example, by being placed between zones and/or producing an audio output for both of the zones. For example, in the embodiment shown in FIG. 2, a first speaker 214*a* is positioned in and produces an audio output for zone 1. A second speaker 214*b* is positioned between and produces an audio output for both zone 1 and zone 4. As described herein, the first speaker 214*a* and audio output by the first speaker 214*a* is dedicated to zone 1, and the second speaker 214*b* and audio output by the second speaker 214*b* are shared by zone 1 and zone 4. A third speaker 214*c* is positioned in and produces an audio output for zone 4. A fourth speaker 214*d* and a fifth speaker 214*e* are positioned in and produce an audio output for zone 7. A sixth speaker 214*f* is positioned in and produces an audio output for zone 8. A seventh speaker 214*g* and an eighth speaker 214*h* are positioned in and produce an audio output for zone 9. A ninth speaker 214*i* is positioned in and produces an audio output for zone 6. A tenth speaker 214*j* is positioned between and produces an audio output for both zone 6 and zone 3. An eleventh speaker 214*k* is positioned in and produces an audio output for zone 3. A twelfth speaker 214*m* is positioned among and produces an audio output for zone 1, zone 2, and zone 3. A thirteenth speaker 214*n* is positioned in zone 2 and produces an audio output for zone 2 and zone 5. As shown in FIG. 2: zone 1, zone 3, zone 4, and zone 6 each have both a dedicated speaker and at least one shared speaker; each of zone 7, zone 8, and zone 9 have dedicated speakers; and zone 5 has a dedicated speaker which is positioned in zone 2. In other embodiments of a cabin of a vehicle, speakers may be positioned and/or configured in the same or a different configuration of dedicated or shared speakers. In this way, some speakers of the cabin 202 are dedicated to a zone while other speakers of the cabin 202 are shared among two or more zones. A method for noise cancellation as further described herein may include determining if the user and/or the auxiliary carrier is positioned in a first zone of the cabin, the first zone having one or more speakers shared with another zone of the cabin, or positioned in a second zone of the cabin, the second zone not having any speakers shared with another zone of the cabin.

As further described with respect to FIGS. 3-5C, a sound level of an audio output from one or more speakers may be at least partially reduced by outputting sound via one or more speakers in response to detection of a user in a zone, where an age of the user is within a predetermined age range (e.g., indicating the user is an infant or an elder) and the sound level is greater than a threshold sound level for the respective age range. For example, the sound level may be reduced to less than the threshold sound level for the respective age range. The speakers which output sound to at least partially reduce the sound level may be determined based on which speakers are outputting the audio output. For example, in response to a user being identified as an infant or an elder positioned in a zone which has all dedicated speakers (e.g., zone 7, zone 8, or zone 9 of FIG. 2), sound may be output by one or more of the dedicated speakers of the respective zone to at least partially reduce the environmental sound level. In another example, in response to the user being identified as an infant or an elder positioned in a zone which has at least one dedicated speaker and at least one shared speaker, sound may be output by one or more of the at least one dedicated speakers to at least partially reduce the environmental sound level. In a further example, if an auxiliary carrier is positioned in a zone which shares one or more speakers with another zone, speakers of the auxiliary carrier (e.g., as further described with respect to FIG. 3) may output sound to at least partially reduce the sound level. Additional information about sound output to at least partially reduce the environmental sound level is described with respect to FIGS. 5A-5C.

Turning to FIG. 3, an illustration 300 is shown which illustrates noise cancellation performed by one or more speakers of a vehicle 310. The illustration 300 includes a user 306 positioned in a zone 302. The vehicle 310 may be an example of the vehicle 102 of FIG. 1 and/or the vehicle 200 of FIG. 2, and the zone 302 may be an example of a zone of the vehicle 200 of FIG. 2. An axis system 350 is provided in FIG. 3 for reference. The y-axis may be a vertical axis (e.g., parallel to a gravitational axis), the x-axis may be a lateral axis (e.g., horizontal axis), and the z-axis may be a longitudinal axis, in one example. However, the axes may have other orientations, in other examples. In the example of FIG. 3, the zone includes four speakers. One or more of the four speakers may be dedicated to the zone, as described with respect to FIG. 2. In some embodiments, one or more of the four speakers may be shared by the zone 302 and another zone of the vehicle 310.

An arrangement of the four speakers shown in FIG. 3 includes a first speaker 304*a* and a second speaker 304*b* positioned on a left side of the zone 302, and a third speaker 304*c* and a fourth speaker 304*d* positioned on a right side of the zone 302. The first speaker 304*a* and the third speaker 304*c* may be referred to herein as front speakers (e.g., positioned near a front end 352 of the vehicle 310), and the second speaker 304*b* and the fourth speaker 304*d* may be referred to as rear speakers (e.g., positioned near a rear end 354 of the vehicle 310). The user 306 may be positioned in different orientations within the zone 302 in different embodiments. For example, the user 306 may be positioned within the zone 302 as shown in FIG. 3 with the user's feet towards the front end 352 of the vehicle 310 and the user's head towards the rear end 354 of the vehicle 310 when the user 306 and/or the auxiliary carrier in which the user 306 is positioned is a first size. In other embodiments, the user 306 may be positioned with the user's feet towards the rear end 354 of the vehicle 310 and the user's head towards the front end 352 of the vehicle 310 when the user 306 and/or the auxiliary carrier in which the user 306 is positioned is a second size, smaller than the first size. Each of the four speakers may have a same configuration with respect to power and range of volume output. Each of the first speaker 304a, the second speaker 304b, the third speaker 304c, and the fourth speaker 304d may be positioned a distance 312 from the user 306, where the distance 312 may be the same or may be different for each of the four speakers. Sound from a speaker of the four speakers is represented by a solid line wave 314 or a dashed line wave 316 from the respective speaker to the user 306. The sound may be same volume and may be the same type of sound (e.g., music, podcast, audiobook, phone call, and so on).

As shown in FIG. 3 and further described with respect to FIGS. 5A-5C, a method for noise cancellation includes controlling one or more vehicle amplifiers (e.g., speakers) to have sound from the left side of the user 306 arrive at the position of the user 306 delayed by one-half wavelength with respect to sound from the right side. For example, delaying the sound by one-half wavelength may be accomplished through the use of readily available digital signal processing (DSP) or field-programmable gate array (FPGA) chips, one or more of which may be included in the in-vehicle computing system. Sound may be output by approximately half of the speakers in the zone. In embodiments which include an even number of speakers (e.g., as shown in FIG. 3), half of the speakers may output sound. In embodiments which include an odd number of speakers, an integer number of speakers which is closest to half of the total number of speakers may output sound to at least partially reduce the environmental sound level. In further embodiments having an odd number of speakers, output by a speaker of the array may be halted to reduce the number of speakers having output to an even number, and half of the speakers having output may output sound to at least partially reduce the environmental sound level. As shown in an illustration 320, the solid line wave 314 from the first speaker 304a and the second speaker 304b, and the dashed line wave 316 from the third speaker 304c and the fourth speaker 304d, offsetting (e.g., delaying) sound from the left side and the right side of the zone 302 results in noise cancellation 318. Noise cancellation in this way can be further described with respect to equation 1 and equation 2:

$$\lambda = v/f \tag{1}$$

$$\Delta t = \left(D_x 1 - D_x r + \lambda/2\right)/v \tag{2}$$

where v is velocity, f is frequency, $\lambda$ is wavelength, D is distance, $\Delta t$ is time delay, x is a position of the speaker (e.g., front or rear), l is left side, and r is right side.

As further described with respect to FIGS. 5A-5C, a method for noise cancellation includes detecting a presence of the user 306 inside the zone 302 via a user sensor (e.g., a pressure sensor, attachment sensor, and/or camera), determining an age of the user 306 to be within an age range indicating the user may be noise sensitive, and determining that an environmental sound level within the zone 302 is greater than a sound threshold for the respective age range. For example, the user sensor may be a camera which is equipped with facial detection and enables detection of the user's position and age. The environmental sound level may include sound output by the speakers of the zone 302 in some embodiments, and be detected by a controller of the vehicle (e.g., the in-vehicle computing system 109) as a commanded volume output level. In other embodiments, the environmental sound level may further include ambient noise, such as talking from other users of the vehicle and road/vehicle noises, which may be detected by a microphone (e.g., microphone 103 of FIG. 1) positioned in the zone 302. In response to the above determinations, the method proceeds to output sound via one or more dedicated speakers of the zone (e.g., the third speaker 304c and the fourth speaker 304d) to at least partially reduce the environmental sound level. For example, when the environmental sound level includes sound output by speakers of the zone 302, the method may include outputting the same sound at the same volume level from each of the first speaker 304a, the second speaker 304b, the third speaker 304c, and the fourth speaker 304d, where the sound output by the third speaker 304c and the fourth speaker 304d is delayed by one-half wavelength, with respect to the sound output by the first speaker 304a and the second speaker 304b. When the environmental sound level also includes additional ambient noise (e.g., from other users, road noise, vehicle noise), sound output by at least one speaker of the zone may include a reflection of ambient sound which is detected by the microphone. In this way, localized noise cancellation may be provided for a zone of a vehicle cabin without adjusting a volume level for all speakers of the vehicle cabin.

Turning to FIG. 4, an illustration 400 is shown which illustrates noise cancellation performed by one or more speakers of an auxiliary carrier 410. The auxiliary carrier 410 includes a seat 402 in which a user 406 may be positioned. The seat 402 may be at least partially positioned within a quiet zone 404 of the auxiliary carrier 410. The auxiliary carrier 410 further includes a microphone array 412 and a speaker array 416 which are positioned in and/or around the quiet zone 404 and are configured to perform noise cancellation within the quiet zone 404 (e.g., at least partially reduce an environmental sound level within the quiet zone 404 to below a threshold sound level), as further described herein and with respect to FIGS. 5A-5C. The microphone array 412 and the speaker array 416 are communicably coupled to an auxiliary carrier computing system 409 of the auxiliary carrier 410. One or more user sensors 418 may be included in the auxiliary carrier 410 which are configured to detect a presence of the user 406 in the seat 402. One or more location sensors 420 may be included in the auxiliary carrier 410 which are configured to detect a position of the auxiliary carrier 410, for example, with respect to a vehicle (e.g., the vehicle 102 of FIG. 1, the vehicle 200 of FIG. 2).

In some embodiments, the auxiliary carrier 410 includes an auxiliary carrier computing system 409 configured to perform one or more of the methods described herein. Auxiliary carrier computing system 409 may include, or be coupled to, various auxiliary carrier systems, sub-systems, hardware components, as well as software applications and systems that are integrated in, or integratable into, the auxiliary carrier 410 in order to enhance an experience for a user of the auxiliary carrier. For example, the microphone array 412 and the speaker array 416 may be included in and/or coupled to the auxiliary carrier computing system 409 and may thus be controlled to operate in a noise-cancelling capacity, as further described herein. The auxiliary carrier computing system 409 may include the one or more user sensors 418 and the one or more location sensor 420, as further described herein. The auxiliary carrier computing system 409 may further be communicably coupled to elements of a vehicle system, such as the in-vehicle computing system 109 of FIG. 1, via a wireless connection.

The auxiliary carrier computing system 409 may include one or more processors including an operating system processor 414, which may execute an operating system on auxiliary carrier computing system 409, and control input/output, playback, and other operations of auxiliary carrier computing system 409. A communication module 422 may output data to one or more elements of the auxiliary carrier computing system 409, while also receiving data input therefrom. The communication module 422 may further enable the auxiliary carrier to communicably connect to a vehicle of a vehicle system which includes both the auxiliary carrier 410 and the vehicle (e.g., the vehicle 102 of FIG. 1). When outputting data, the communication module 422 may provide a signal via a bus corresponding to any status of the auxiliary carrier, the auxiliary carrier surroundings, or the output of any other information source connected to the auxiliary carrier. Auxiliary carrier data outputs may include, for example, analog signals (such as current velocity) and digital signals provided by individual information sources (e.g., a location sensor 420, such as Global Positioning System (GPS) sensors). For example, auxiliary carrier computing system 409 may retrieve from the location sensor 420 a position of the auxiliary carrier with respect to a vehicle in which the auxiliary carrier may be positioned, and may retrieve from the user sensor 418 indication of a presence of a user in the auxiliary carrier 410. The user sensor 418 may be one or more of a camera, a pressure sensor, an attachment sensor, and/or another type of sensor configured to detect a presence of a user in the auxiliary carrier. The location sensor 420 may be one or more of a GPS or an attachment sensor configured to detect coupling of the auxiliary carrier 410 to the vehicle (e.g., via a latch to a seat of the vehicle 102).

A storage device 408 may be included in auxiliary carrier computing system 409 to store data such as instructions executable by operating system processor 414 in non-volatile form. For example, the storage device 408 may be a non-transitory storage device, which may store instructions and/or code that, when executed by a processor (e.g., operating system processor 414), controls auxiliary carrier computing system 409 to perform one or more of the actions described in the disclosure.

A communication module 422 of auxiliary carrier computing system 409 may be coupleable to and/or communicate with one or more external devices located external to the auxiliary carrier. For example, the communication module 422 may enable communication among the auxiliary carrier computing system 409 and the in-vehicle computing system 109 of the vehicle 102 of FIG. 1. In some embodiments, the communication module 422 may enable communication with external devices other than a vehicle, such as a mobile device (e.g., mobile phone, smart phone, wearable devices/sensors). As further described with respect to FIGS. 5A-5C, communication between the auxiliary carrier computing system 409 and the in-vehicle computing system 109 may enable noise cancellation to be performed by the auxiliary carrier 410 or by the vehicle, depending on a position of the auxiliary carrier 410 with respect to the vehicle. Briefly, when the auxiliary carrier 410 is positioned in the vehicle, speakers of the zone of the vehicle in which the auxiliary carrier 410 is positioned may output sound to at least partially reduce an environmental sound level in the zone. When the auxiliary carrier 410 is positioned outside of the vehicle, speakers of the speaker array 416 of the auxiliary carrier 410 may output sound to at least partially reduce an environmental sound level within the quiet zone 404 of the auxiliary carrier 410.

The microphone array 412 may include one or more microphones to detect an environmental sound level within the quiet zone 404 of the auxiliary carrier 410. For example, the environmental sound level may include people talking, outdoor noises, vehicle noises, music, and so on. The speaker array 416 may include one or more acoustic reproduction devices including electromagnetic transducers such as one or more speakers, where each of the one or more speakers has the same or a different configuration. The operating system processor 414 may receive audio input from one or more microphones of the microphone array 412 and execute instructions (e.g., the method described herein with respect to FIGS. 5A-5C) stored on the storage device 408 to generate and output control signals to control audio output at one or more speakers of the speaker array 416. For example, the control signals may adjust audio output characteristics such as volume, equalization, audio distribution among a plurality of speakers, and so on. For example, as further described herein with respect to FIGS. 5A-5C, audio output characteristics of the speaker array 416 of the auxiliary carrier 410 may be adjusted in response to determination that a user is positioned in the auxiliary carrier 410 and an environmental sound level (e.g., detected by one or more microphones of the microphone array 412) is greater than a threshold sound level. Sound may be output by one or more speakers of the speaker array 416 to at least partially reduce the environmental sound level (e.g., to at least less than the threshold sound level). Environmental sound is illustrated in FIG. 4 as a solid line wave 424 which enters the auxiliary carrier 410 and the quiet zone 404 thereof. Sound output by one or more speakers of the speaker array 416 is illustrated as a dashed line wave 426. Sound enters the quiet zone 404 and is offset from environmental sound by one-half wavelength, which results in noise cancellation. For example, delaying the sound by one-half wavelength may be accomplished through the use of one or more of a DSP chip and a FPGA chip, which may be included in the auxiliary carrier computing system 409. Noise cancellation in this way can be further described with respect to equation 3:

$$\Delta t = \lambda/2/v \qquad (3)$$

where v is velocity, $\lambda$ is wavelength, and $\Delta t$ is time delay. In this way, noise cancellation may be provided which is localized to the quiet zone of the auxiliary carrier when the auxiliary carrier is in different environments. Noise cancellation may be provided by elements of the auxiliary carrier when the auxiliary carrier is inside a vehicle, outside of the vehicle, and/or transitioning into or out of the vehicle.

In some embodiments, noise cancellation performed by one or more speakers of an auxiliary carrier may be performed by a system which may be selectively coupled to the auxiliary carrier. For example, a system for an auxiliary carrier may be selectively coupled to an auxiliary carrier without a microphone array and/or a speaker array. The system for the auxiliary carrier may include elements described with respect to FIG. 4, including the auxiliary carrier computing system 409, the microphone array 412, and the speaker array 416. The auxiliary carrier system may provide a quiet zone, similar to the quiet zone 404 described with respect to FIG. 4, when coupled to the auxiliary carrier. For example, the system for the auxiliary carrier may include: a location sensor selectively coupled to the auxiliary carrier, the location sensor configured to detect a relative position of the auxiliary carrier with respect to a vehicle; a user sensor configured to detect a presence of a user in the auxiliary carrier; a microphone array configured to receive a sound input; a speaker array configured to output sound in a direction towards the auxiliary carrier; and a controller with computer-readable instructions that, when executed, cause the controller to identify a position of the auxiliary carrier with respect to the vehicle via the location sensor, identify the presence of the user in the auxiliary carrier, and, in response to the auxiliary carrier being positioned in the vehicle and the presence of the user in the auxiliary carrier being detected, detect the sound input via the microphone array and output sound, via the speaker array, to at least partially reduce a volume level of the sound input.

Turning to FIGS. 5A, 5B, and 5C, a high level flow chart is shown for a method 500 for automatically adjusting a volume in an area occupied by a user to reduce the volume to within a desirable volume range for an age range in response to an age of the user being within the age range. The method 500 described herein may be implemented in a vehicle system which includes a vehicle and an auxiliary carrier which may be selectively positioned in the vehicle (e.g., as described with respect to FIGS. 1-4). The method 500 may be implemented by one or more of the above described systems, including the in-vehicle computing system 109 of FIG. 1, the auxiliary carrier computing system 409 of FIG. 4, or other embodiments of the systems described with respect to FIGS. 1-4. As such, the method 500 may be stored as executable instructions in non-transitory memory (e.g., non-volatile storage device 108 and/or non-volatile memory 119B, storage device 408) and executed by a processor (e.g., operating system processor 114 and/or interface processor 120, operating system processor 414). As further described herein, in some embodiments, operations of the method may be performed by a first element of the vehicle system (e.g., the vehicle) and/or by a second element of the vehicle system (e.g., the auxiliary carrier).

At 502, method 500 includes monitoring vehicle cabin conditions for a cabin of a vehicle (e.g., the cabin 202 of the vehicle 200). This may include using sensors of the vehicle (e.g., of the sensor subsystem 110) and elements of the vehicle control system to detect a presence of one or more users in the cabin of the vehicle. For example, user sensors such as a pressure sensor which is positioned in a seat (e.g., the seat 402) of the cabin may indicate to the processor detection of a weight deviation (e.g., an increase in weight caused by a user sitting in the seat), which may be interpreted by the processor as detection that a user is present in the respective seat. In another example, a cabin camera may detect a presence of one or more users in the cabin of the vehicle using facial recognition. Monitoring vehicle cabin conditions may further include identifying an environmental sound level within the cabin, where the environmental sound level is an ambient volume within the cabin of the vehicle. The environmental sound level may include audio output by speakers of the cabin, audio output by external devices (e.g., mobile phone, portable speaker) which are positioned in the cabin, operational sounds of the vehicle (e.g., engine and/or electric machine noises), and so on. The environmental sound level may be detected by one or more microphone positioned in the cabin of the vehicle (e.g., the microphone 103), and/or by referencing a set speaker audio output level (e.g., as set via a user interface).

At 504, method 500 includes determining if an auxiliary carrier is detected by the vehicle. The auxiliary carrier may be configured to receive an infant and/or small child and may be, for example the auxiliary carrier 410 of FIG. 4. The auxiliary carrier may be detected by a location sensor and/or an attachment sensor of the vehicle, for example. When the auxiliary carrier is positioned inside the cabin of the vehicle, a user sensor of a zone such as a pressure sensor, a camera, an attachment sensor, and so on may be used to detect the presence of the auxiliary carrier. The auxiliary carrier may alternatively be moving into or out of the cabin of the vehicle, which may be detected by a location sensor of the auxiliary carrier sending a signal to a controller of vehicle (e.g., the in-vehicle computing system) indicating the auxiliary carrier is moving into or out of the vehicle. The vehicle may further detect the auxiliary carrier when the auxiliary carrier is positioned outside of the vehicle, in some embodiments. If an auxiliary carrier is not detected by the vehicle, method 500 proceeds to 506.

At 506, method 500 includes determining if a user is present in the cabin. The presence of one or more users in the cabin may be detected using vehicle sensors, as described with respect to operation 502. For example, the user sensor may be a camera which is equipped with facial detection and enables detection of the user's position and age. If it is determined that no users are present in the cabin, the method returns to 502. If it is determined that at least one user is present in the cabin, method 500 proceeds to 508.

At 508, method 500 includes detecting a zone in which the user is positioned, and an age of the user. Operation 508 may be performed for each user in the cabin of the vehicle. For example, at operation 506, it may be determined that more than one user is present in the cabin. At operation 508, a zone in which each user is positioned and an age of each user may be detected, where information about a position and an age of a user are associated to be used together later in the method 500. As described with respect to FIG. 2, the cabin of the vehicle may be divided into multiple zones, each of which may include an area in which a user may be positioned. In some embodiments, each zone may be configured to receive one user, while in other embodiments, each zone may be configured to receive more than one user. As described with respect to FIGS. 1-3, the cabin, including one or more zones of the cabin, may include sensors configured to detect an age of a user. For example, the cabin may include a cabin camera configured to detect a presence of a user, as described above, as well as the zone of the cabin in which the user is positioned, and an age of the user. The cabin camera and/or another sensor of the vehicle configured to detect the age of the user may determine an integer age of the user and/or may identify a likely age range in which the user's age falls.

At 510, the method 500 includes determining if the age of the user is within a first age range, a second age range, or neither of the first age range nor the second age range. Each of the first age range and the second age range may define separate, different age ranges within which a user may be sensitive to loud volume noise (e.g., greater than 60 dB). The first age range may include infants and toddlers, for example, three years old and younger. The second age range may include elders, for example, sixty-five years old and above. In some embodiments, as further described herein, the first age range and the second age range may define age ranges which may be sensitive to different non-zero volume levels (e.g., a maximum desirable sound level for infants is less than that of elders). If it is determined that the age of the user is not within the first age range or the second age range, method 500 returns to operation 502 to monitor vehicle cabin conditions.

If it is determined that the age of the user is within the first age range, method 500 proceeds to 512. At 512, method 500 includes determining if the environmental sound level is greater than a first sound level threshold. The first sound level threshold is associated with the first age range, and is a maximum sound level (e.g., volume) which is desirable for users whose age is within the first age range. For example, when the first age range is ages three years and below, the first sound level threshold may be 60 dB. In some embodiments, the environmental sound level may be the level detected at operation 502. In other embodiments, the environmental sound level may be detected at operation 512 and may be an environmental sound level within the zone in which the user is positioned. For example, a microphone (e.g., environmental sound sensor 216) of the in-vehicle computing system may be positioned in the zone and configured to detect the environmental sound level within the zone. The environmental sound level within the zone may include sound from speakers of the zone and, in some embodiments, from speakers of surrounding zones. If it is determined that the environmental sound level is not greater than the first sound level threshold, method 500 maintains vehicle cabin conditions at 560 and returns to start. If it is determined that the environmental sound level is greater than the first sound level threshold, method 500 proceeds to 514.

At 514, method 500 includes outputting sound via one or more speakers of the zone in which the user is positioned to reduce the environmental sound level to less than the first sound level threshold. As described herein, the first sound level may be 60 dB when the first age range includes ages three years and younger. The environmental sound level may be reduced, as described herein, to less than 60 dB. In some embodiments, the environmental sound level may be reduced to 90%, 80%, 70%, and so on of the first sound level, where a percent reduction may be automatically determined based on an age and/or a size of the user, and/or in response to a user input. As described with respect to FIGS. 2-3, a zone of the cabin of the vehicle may include one or more dedicated speakers and, in some embodiments, one or more shared speakers. Sound may be output by one or more of the one or more dedicated speakers in order to focus noise cancellation on the zone in which the user is positioned. Sound which is output by the one or more dedicated speakers may be the same sound as is output by other dedicated speakers and shared speakers of the zone. For example, the environmental sound level may include music, audiobook, navigational direction, or other sound output. Sound which is output by one or more dedicated speakers to reduce the environmental sound level may be the same sound, and may be output at a one-half wavelength delay with respect to the environmental sound level, thus cancelling out the environmental sound. For example, delaying the sound by one-half wavelength may be accomplished through the use of one or more of a DSP chip and a FPGA chip. Sound may be output by approximately half of the speakers in the zone, for example. In embodiments which include an even number of speakers (e.g., as shown in FIG. 3), half of the speakers may output sound. In embodiments which include an odd number of speakers, an integer number of speakers which is closest to half of the total number of speakers may output sound to at least partially reduce the environmental sound level. In further embodiments having an odd number of speakers, output by a speaker of the array may be halted to reduce the number of speakers having output to an even number, and half of the speakers having output may output sound to at least partially reduce the environmental sound level.

Returning to operation 510, if it is determined that the age of the user is within the second age range, method 500 proceeds to 516. At 516, method 500 includes determining if the environmental sound level is greater than a second sound level threshold. The second sound level threshold is associated with the second age range, and is a maximum sound level (e.g., volume) which is desirable for users whose age is within the second age range. For example, when the second age range is ages sixty-five years and above, the second sound level threshold may be 65 dB. The environmental sound level may be reduced, as described herein, to less than 65 dB. In some embodiments, the environmental sound level may be reduced to 90%, 80%, 70%, and so on of the second sound level, where a percent reduction may be automatically determined based on an age and/or a size of the user, and/or in response to a user input. In some embodiments, the environmental sound level may be the level detected at operation 502. In other embodiments, the environmental sound level may be detected at operation 516 and may be an environmental sound level within the zone in which the user is positioned. For example, a microphone (e.g., the environmental sound sensor 216) of the in-vehicle computing system may be positioned in the zone and configured to detect the environmental sound level within the zone. The environmental sound level within the zone may include sound from speakers of the zone and, in some embodiments, from speakers of surrounding zones. If it is determined that the environmental sound level is not greater than the second sound level threshold, method 500 returns to start. If it is determined that the environmental sound level is greater than the second sound level threshold, method 500 proceeds to 518.

At 518, method 500 includes outputting sound via one or more speakers of the zone in which the user is positioned to reduce the environmental sound level to less than the second sound level threshold. As described with respect to FIGS. 2-3, a zone of the cabin of the vehicle may include one or more dedicated speakers and, in some embodiments, one or more shared speakers. Sound may be output by one or more of the one or more dedicated speakers in order to focus noise cancellation on the zone in which the user is positioned. Sound which is output by the one or more dedicated speakers may be the same sound as is output by other dedicated speakers and shared speakers of the zone. For example, the environmental sound level may include music, audiobook, navigational direction, or other sound output. Sound which is output by one or more dedicated speakers to reduce the environmental sound level may be the same sound, and may be output at a one-half wavelength delay with respect to the environmental sound level, thus cancelling out the environmental sound. For example, delaying the sound by one-half wavelength may be accomplished through the use of one or more of a DSP chip and a FPGA chip. Sound may be output by approximately half of the speakers in the zone, for example. In embodiments which include an even number of speakers (e.g., as shown in FIG. 3), half of the speakers may output sound. In embodiments which include an odd number of speakers, an integer number of speakers which is closest to half of the total number of speakers may output sound to at least partially reduce the environmental sound level. In further embodiments having an odd number of speakers, output by a speaker of the array may be halted to reduce the number of speakers having output to an even number, and half of the speakers having output may output sound to at least partially reduce the environmental sound level.

The method 500 as described with respect to FIG. 5A thus illustrates a method for noise cancellation when a user is positioned in zone of the cabin of the vehicle when an auxiliary carrier is not detected by the vehicle. Noise cancellation is performed by speakers of the zone of the vehicle in which the user is positioned outputting sound which is offset from environmental sound by one-half wavelength to cancel out the environmental sound. In this way, noise cancellation is performed in a localized area (e.g., the zone in which the user is positioned) and is performed in response to vehicle cabin conditions exceeding parameters based on the age of the user (e.g., environmental sound level exceeding the respective sound level threshold).

Returning to operation 506, if an auxiliary carrier (e.g., the auxiliary carrier of FIG. 4) is detected by the vehicle, method 500 proceeds to 520, as described with respect to FIG. 5B. In some embodiments, method 500 may be initiated at operation 522 by a controller of the auxiliary carrier (e.g., the auxiliary carrier computing system) independent of execution of operations 502-504 by the controller of the vehicle. In some embodiments, operation 522 and subsequent operations of the method 500 may be executed by the controller of the vehicle, except when described otherwise herein. As described with respect to FIG. 4, the auxiliary carrier computing system and the in-vehicle computing system may be communicably coupled, and may thus operate as a single computing system for a vehicle system which includes both the auxiliary carrier and the vehicle. For example, signals detected by sensors of the auxiliary carrier may be relayed to the in-vehicle computing system during execution of method 500, as further described herein.

At 522 of FIG. 5B, method 500 includes monitoring auxiliary carrier conditions. For example, auxiliary carrier conditions include an environmental sound level within a quiet zone of the auxiliary carrier (e.g., as described with respect to FIG. 4). The environmental sound level may be detected by one or more microphones of the auxiliary carrier (e.g., the microphone array 412). The environmental sound level may include sounds from an environment in which the auxiliary carrier is positioned (e.g., inside or outside of the vehicle) audio output by speakers of the cabin, audio output by external devices (e.g., mobile phone, portable speaker) which are positioned in the cabin, operational sounds of the vehicle (e.g., engine and/or electric machine noises), and so on. The environmental sound level may be detected by one or more microphones positioned in the cabin of the vehicle (e.g., the microphone 103), and/or by referencing a set speaker audio output level (e.g., as set via a user interface). Monitoring auxiliary carrier conditions may further include using one or more user sensors of the auxiliary carrier to detect a presence a user in the auxiliary carrier. For example, a user sensor (e.g., the user sensor 418 of FIG. 4) such as a pressure sensor which is positioned in a seat (e.g., the seat 402) of the auxiliary carrier may indicate to the processor detection of a weight deviation (e.g., an increase in weight caused by a user sitting in the seat), which may be interpreted by the processor as detection that a user is present in the seat. In another example, the user sensor may be a camera configured to detect a presence of a user in the auxiliary carrier using facial recognition.

At 524, method 500 includes determining if a user is present in the auxiliary carrier. If it is determined that a user is not present in the auxiliary carrier, the method 500 returns to operation 522 to monitor auxiliary carrier conditions. If it is determined that a user is present in the auxiliary carrier, method 500 proceeds to 526.

At 526, method 500 include determining a position of the auxiliary carrier with respect to a vehicle. The vehicle may be, for example, a vehicle which executed operations of the method 500 (e.g., operations 502-520), as described above. In other embodiments, the controller of the auxiliary carrier may be executing the method 500, and the vehicle may be a vehicle configured with noise cancellation elements and instructions (e.g., the vehicle 200 of FIG. 2). The position of the auxiliary carrier may be determined using one or more location sensor (e.g., the location sensor 420) of the auxiliary carrier. For example, the one or more location sensor may indicate a position of the auxiliary carrier, and the position of the auxiliary carrier may be compared to a position of the vehicle, which may be determined using one or more location sensors of the vehicle (e.g., of the sensor subsystem 110). The auxiliary carrier may be positioned in the vehicle, outside of the vehicle, or transitioning into or out of the vehicle. It may be determined that the auxiliary carrier is in the vehicle when the auxiliary carrier position is stationary and within the vehicle position. It may be determined that the auxiliary carrier is outside of the vehicle when the auxiliary carrier position is stationary and does not overlap with the vehicle position. It may be determined that the auxiliary carrier is moving into the vehicle when the auxiliary carrier position is changing and is moving towards overlapping with the vehicle position. It may be determined that the auxiliary carrier is moving out of the vehicle when the auxiliary carrier position is changing and is moving away from overlapping with the vehicle position.

At 528, the method 500 includes determining if the auxiliary carrier is in the vehicle. If the auxiliary carrier is not in the vehicle, the method 500 proceeds to 540 to continue to FIG. 5C. If the auxiliary carrier is in the vehicle, the method 500 proceeds to 530.

At 530, method 500 include detecting a zone in which the auxiliary carrier is positioned, and an environmental sound level within the zone. As described with respect to FIG. 2, the cabin of the vehicle is divided into zones, where each zone may include one or more user sensors and/or sound detectors. The zone in which the auxiliary carrier is positioned may be detected using sensors of the cabin, sensors of the zone, and/or sensors of the auxiliary carrier. Additionally, the environmental sound level within the zone may be detected using sound sensors of the zone (e.g., environmental sound sensor 216) and/or sound sensors of the auxiliary carrier (e.g., the microphone array 412). In some embodiments, an environmental sound level within the quiet zone of the auxiliary carrier may be detected in addition to or alternatively to detection of the environmental sound level in the zone.

At 532, method 500 includes determining if the environmental sound level detected at operation 532 is greater than a sound level threshold. The sound level threshold may be, for example a maximum desirable volume level for an age range for which the auxiliary carrier is designed. For example, if the auxiliary carrier is designed to hold infants and children ages three years old and younger, the sound level threshold may be 60 dB. If it is determined the environmental sound level is not greater than the sound level threshold, the method 500 returns to operation 522 to monitor auxiliary carrier conditions. If it is determined the environmental sound level is greater than the sound level threshold, the method 500 proceeds to 534.

At 534, method 500 includes determining if one or more speakers of the zone in which the auxiliary carrier is positioned are shared with another zone. As described with respect to FIG. 2, in some embodiments, one or more speakers may be shared among one or more zones of the cabin, and thus provide sound output to each of the zones among which the speaker is shared. In order to localize noise cancellation, it is desirable to determine which speaker(s) are shared among zones and, in some embodiments, perform noise cancellation for speakers which are not shared among multiple zones, as further described herein. Thus, noise cancellation may be localized to the desired zone.

If it is determined one or more speakers of the zone in which the auxiliary carrier is positioned are shared with one or more additional zones, method 500 proceeds to 536. At 536, method 500 includes outputting sound via speakers of the auxiliary carrier to at least partially reduce the environmental sound level. For example, sound may be output by the array of speakers of the auxiliary carrier to reduce the environmental sound level within the quiet zone of the auxiliary carrier to less than the sound level threshold by outputting sound which is delayed by one-half wavelength from sound received by the speaker array. For example, delaying the sound by one-half wavelength may be accomplished through the use of one or more of a DSP chip and a FPGA chip.

If, at 534, it is determined one or more speakers of the zone in which the auxiliary carrier is positioned are not shared with another zone, the method 500 proceeds to 538. At 538, method 500 includes outputting sound via speakers of the zone in which the auxiliary carrier is positioned to at least partially reduce the environmental sound level within the zone. As speakers of the zone are not shared with other zones, outputting sound via speakers of the zone may reduce the environmental sound level within the zone to less than the sound level threshold without affecting the environmental sound level in other zones of the cabin of the vehicle. Sound may be output by approximately half of the speakers in the zone, for example. In embodiments which include an even number of speakers (e.g., as shown in FIG. 3), half of the speakers may output sound. In embodiments which include an odd number of speakers, an integer number of speakers which is closest to half of the total number of speakers may output sound to at least partially reduce the environmental sound level. In further embodiments having an odd number of speakers, output by a speaker of the array may be halted to reduce the number of speakers having output to an even number, and half of the speakers having output may output sound to at least partially reduce the environmental sound level.

Returning to operation 528, if it is determined that the auxiliary carrier is not positioned in the vehicle, method 500 proceeds to 540 to continue to FIG. 5C. At operation 542 of FIG. 5C, method 500 includes determining if the auxiliary carrier is moving. If it is determined the auxiliary carrier is not moving, method 500 proceeds to 544. As briefly described above, if the auxiliary carrier is not positioned in the vehicle and not moving, it is determined the auxiliary carrier is in a stationary (e.g., not moving into or out of the vehicle) position outside of the vehicle. Upon determination that the auxiliary carrier is outside of the vehicle, execution of the method 500 may fully transition to being performed by the control system of the auxiliary carrier.

At 544, the method 500 includes detecting an environmental sound level. The auxiliary carrier may be positioned in a room, outside, or in another environment which includes ambient environmental noise, such as people talking, music, nature noises, and so on, which may exceed a sound level threshold. The environmental sound level may be detected using sound sensors of the auxiliary carrier (e.g., the microphone array 412), which may detect the environmental sound level within the quiet zone of the auxiliary carrier (e.g., sound from the environment in which the auxiliary carrier which reaches the quiet zone, and thus the user).

At 546, the method 500 includes determining if the environmental sound level is greater than the sound level threshold. As described above, the sound level threshold may be a maximum desirable volume level for an age range for which the auxiliary carrier is designed. For example, if the auxiliary carrier is designed to hold infants and children ages three years old and younger, the sound level threshold may be 60 dB. If it is determined the environmental sound level is not greater than the sound level threshold, the method 500 maintains auxiliary carrier conditions at 562 and returns to operation 522 to monitor auxiliary carrier conditions. If it is determined the environmental sound level is greater than the sound level threshold, the method 500 proceeds to 548.

At 548, the method 500 includes outputting sound via speakers of the auxiliary carrier to at least partially reduce the environmental sound level. For example, sound may be output by the array of speakers of the auxiliary carrier to reduce the environmental sound level within the quiet zone of the auxiliary carrier to less than the sound level threshold.

Returning to operation 542, if it is determined the auxiliary carrier is moving, the method 500 proceeds to 550. At 550, the method 500 includes detecting if the auxiliary carrier is moving into or out of the vehicle. As described above, movement of the auxiliary carrier with respect to the vehicle may be determined using one or more of location sensors of the auxiliary carrier and the vehicle. It may be determined that the auxiliary carrier is moving into the vehicle when the auxiliary carrier position is changing and is moving towards overlapping with the vehicle position. It may be determined that the auxiliary carrier is moving out of the vehicle when the auxiliary carrier position is changing and is moving away from overlapping with the vehicle position. If it is determined the auxiliary carrier is moving out of the vehicle, the method 500 proceeds to 556.

At 556, the method determines if sound is being output by speakers of the vehicle. For example, the auxiliary carrier may have been positioned in the cabin of the vehicle and speakers of the zone in which the auxiliary carrier was positioned may have been outputting sound to at least partially reduce environmental sound in the zone. In response to the auxiliary carrier being removed from the vehicle, noise cancellation performed by speakers of the zone of the vehicle may no longer be desired. For example, a user who is not within an age range sensitive to noise, or who is within a different age range with different noise sensitivities may enter the zone previously occupied by the auxiliary carrier and the user therein. For example, the first age range may include ages three years old and younger, which are sensitive to a first sound level threshold, which may be sensitivity to sounds above 60 dB. The second age range may include elders, for example, sixty-five years old and above, which are sensitive to a second sound level, which may be sensitivity to sounds above 65 dB. Thus, if it is determined that sound is being output by speakers of the vehicle, the method proceeds to 558. At 558, the method 500 includes halting output of sound by speakers of the vehicle. In some embodiments, sound which is used to decrease the environmental sound level may be halted. In further embodiments, all sounds from speakers of the zone, including sound which is used to decrease the environmental sound level and other sound output by speakers of the zone (e.g., music, podcast, audiobook, and so on) may be halted.

Returning to operation 556, if it is determined that sound is not being output by speakers of the vehicle while the auxiliary carrier is moving out of the vehicle, the method 500 proceeds to operation 544 to detect the environmental sound level, as described above. In this way, noise cancellation provided by the auxiliary carrier may initiate and/or switch from noise cancellation provided by the vehicle when the auxiliary carrier is moving out of the vehicle.

Returning to operation 550, if it is determined the auxiliary carrier is moving into the vehicle, the method 500 proceeds to 552. At 552, the method includes determining if sound is being output by speakers of the auxiliary carrier. For example, while the auxiliary carrier is positioned outside of the vehicle, speakers of the auxiliary carrier may provide environmental noise cancellation by outputting sound to at least partially reduce the environmental sound level, as described herein. In some embodiments, noise cancellation may not be performed by the auxiliary carrier when the auxiliary carrier is outside of the vehicle. For example, environmental sound levels outside of the vehicle may be less than the sound level threshold. If sound is not being output by speakers of the auxiliary carrier when the auxiliary carrier is moving into the vehicle, the method 500 maintains auxiliary carrier conditions at 564 and proceeds to operation 530 of FIG. 5B to detect a zone of the cabin in which the auxiliary carrier is being positioned, and further detect an environmental sound level within the zone and perform noise cancellation.

If it is determined at 522 that sound is being output by the speakers of the auxiliary carrier, the method proceeds to 554. At 554, the method 500 includes halting output of sound by speakers of the auxiliary carrier. As described with respect to FIG. 5B, in some embodiments, noise cancellation may be performed by the vehicle (e.g., sound output by speakers of the zone in which the auxiliary carrier is positioned). Thus, noise cancellation performed by the auxiliary carrier may be halted when the auxiliary carrier is moving into the vehicle, and method 500 may proceed to determine if noise cancellation is desired, and whether it is desirable for noise cancellation to be performed by the auxiliary carrier or by the vehicle.

In this way, localized noise cancellation may be provided based on an age of a user present in an auxiliary carrier and/or a vehicle. Switching among speakers of the auxiliary carrier and speakers of the zone of the vehicle to provide noise cancellation depending on a position of the auxiliary carrier and configuration of speakers within the zone enables noise cancellation to be focused to the position of the user sensitive to noise. Automatic detection of user age, position, and presence of the auxiliary carrier may decrease complexity of noise cancellation as well as increase responsiveness of noise cancellation (e.g., decrease time between user detection and noise cancellation activation).

The disclosure also provides support for a method for an auxiliary carrier, comprising: outputting sound via a speaker array of the auxiliary carrier positioned in a first zone of a vehicle to at least partially reduce an environmental sound level when the environmental sound level exceeds a first sound level threshold, and outputting sound via speakers of a second zone of the vehicle to at least partially reduce the environmental sound level when the auxiliary carrier is positioned in the second zone of the vehicle and the environmental sound level exceeds a second sound level threshold. In a first example of the method, one or more speakers of the first zone of the vehicle are shared by another zone of the vehicle, and outputting sound via the speaker array of the auxiliary carrier positioned in the first zone includes outputting the same sound as is output by speakers of the first zone, delayed by one-half wavelength with respect to sound output by speakers of the first zone. In a second example of the method, optionally including the first example, speakers of the second zone of the vehicle are not shared by another zone of the vehicle, and outputting sound via speakers of the second zone includes outputting sound via a first half of the speakers of the second zone which is the same sound as is output by a second half of the speakers of the second zone and is delayed from the sound output by the second half of the speakers of the second zone by one-half wavelength. In a third example of the method, optionally including one or both of the first and second examples, the method further comprises: determining whether the auxiliary carrier is in the vehicle, is transitioning into or out of the vehicle, or is out of the vehicle, and in response to the auxiliary carrier being positioned out of the vehicle, detecting the environmental sound level using a microphone array of the auxiliary carrier and outputting sound via the speaker array of the auxiliary carrier to at least partially reduce the environmental sound level to less than a third sound level threshold. In a fourth example of the method, optionally including one or more or each of the first through third examples, the method further comprises: halting output of sound via the speaker array of the auxiliary carrier when the auxiliary carrier is transitioning into the vehicle. In a fifth example of the method, optionally including one or more or each of the first through fourth examples, determining whether the auxiliary carrier is transitioning into or out of the vehicle includes comparing a location of the auxiliary carrier to a position of the vehicle. In a sixth example of the method, optionally including one or more or each of the first through fifth examples, the method further comprises: halting output of sound via speakers of the second zone of the vehicle when the auxiliary carrier is transitioning out of the vehicle. In a seventh example of the method, optionally including one or more or each of the first through sixth examples, the method further comprises: detecting the environmental sound level using a microphone array of the auxiliary carrier and outputting sound via the speaker array of the auxiliary carrier to at least partially reduce the environmental sound level to less than a fourth sound level threshold. In an eighth example of the method, optionally including one or more or each of the first through seventh examples, the method further comprises: detecting a zone of the vehicle in which the auxiliary carrier is positioned, in response to the auxiliary carrier being positioned in the first zone, detecting the environmental sound level using a microphone array of the auxiliary carrier and outputting sound via a speaker array of the auxiliary carrier to at least partially reduce the environmental sound level, and, in response to the auxiliary carrier being positioned in the second zone, detecting the environmental sound level using a commanded volume output level of the speakers of the zone.

The disclosure also provides support for a method for a vehicle system, comprising: detecting a presence of a user in a vehicle, detecting an age of the user, detecting a zone of the vehicle in which the user is positioned, detecting an environmental sound level within the zone of the vehicle in which the user is positioned, and in response to the environmental sound level within the zone of the vehicle exceeding a sound level threshold when the user is in the zone of the vehicle, outputting sound via speakers of the zone to reduce the environmental sound level to at least a first level when the age of the user is within a first age range, and to reduce the environmental sound level to at least a second level when the age of the user is within a second age range, different from the first age range. In a first example of the method, the presence of the user is detected using one or more of a camera, a pressure sensor, and/or an attachment sensor of the vehicle. In a second example of the method, optionally including the first example, the zone of the vehicle in which the user is positioned is detected using one or more of a camera, a pressure sensor, and/or an attachment sensor of the vehicle. In a third example of the method, optionally including one or both of the first and second examples, detecting the environmental sound level within the zone of the vehicle in which the user is positioned includes detecting a volume of sound output by speakers of the zone. In a fourth example of the method, optionally including one or more or each of the first through third examples, outputting sound via speakers of the zone includes outputting sound from approximately half of the speakers of the zone. In a fifth example of the method, optionally including one or more or each of the first through fourth examples, the method further comprises: detecting whether the user is positioned in an auxiliary carrier having a microphone array and a speaker array configured to output sound to at least partially reduce the environmental sound level, in response to the user being positioned in the auxiliary carrier, determining if one or more speakers of the zone are shared with another zone of the vehicle, in response to one or more speakers of the zone being shared with another zone of the vehicle, halting sound output by speakers of the zone and outputting sound via speakers of the auxiliary carrier to at least partially reduce the environmental sound level.

The disclosure also provides support for a system for an auxiliary carrier, comprising: a location sensor selectively coupled to the auxiliary carrier, a user sensor configured to detect a presence of a user in the auxiliary carrier, a microphone array configured to receive a sound input, a speaker array configured to output sound in a direction towards the auxiliary carrier, and a controller with computer-readable instructions that, when executed, cause the controller to identify a position of the auxiliary carrier with respect to the vehicle via the location sensor, identify the presence of the user in the auxiliary carrier, and, in response to the auxiliary carrier being positioned in the vehicle and the presence of the user in the auxiliary carrier being detected, detect the sound input via the microphone array and output sound, via the speaker array, to at least partially reduce a volume level of the sound input. In a first example of the system, the location sensor is further configured to detect a zone of the vehicle in which the auxiliary carrier is positioned. In a second example of the system, optionally including the first example, the user sensor is further configured to detect an age of the user. In a third example of the system, optionally including one or both of the first and second examples, the controller is further configured to, in response to the age of the user being in a first range, output sound to reduce the volume level of the sound input to a first level and, in response to the age of the user being in a second range, output sound to reduce the volume level of the sound input to a second level different from the first level. In a fourth example of the system, optionally including one or more or each of the first through third examples, the controller is further configured to: identify the presence of the user in the seat and, in response to the auxiliary carrier being positioned outside of the vehicle and the presence of the user being detected, detect the sound input via the microphone array, and in response to the sound input exceeding a sound level threshold, output sound via the speaker array to at least partially reduce the volume level of the sound input.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The methods may be performed by executing stored instructions with one or more logic devices (e.g., processors) in combination with one or more additional hardware elements, such as storage devices, memory, hardware network interfaces/antennas, switches, actuators, clock circuits, et cetera. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and preceded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," et cetera are used merely as labels, and are not intended to impose numerical requirements or a particular positional order on their objects. The following claims particularly point out subject matter from the above disclosure that is regarded as novel and non-obvious.

The invention claimed is:

1. A method for an auxiliary carrier, comprising:
outputting sound via a speaker array of the auxiliary carrier positioned in a first zone of a vehicle to at least partially reduce an environmental sound level when the environmental sound level exceeds a first sound level threshold; and
outputting sound via speakers of a second zone of the vehicle to at least partially reduce the environmental sound level when the auxiliary carrier is positioned in the second zone of the vehicle and the environmental sound level exceeds a second sound level threshold, wherein one or more speakers of the first zone of the vehicle are shared by another zone of the vehicle, and outputting sound via the speaker array of the auxiliary carrier positioned in the first zone includes outputting the same sound as is output by speakers of the first zone, delayed by one-half wavelength with respect to sound output by speakers of the first zone.

2. The method of claim 1, wherein speakers of the second zone of the vehicle are not shared by another zone of the vehicle, and outputting sound via speakers of the second zone includes outputting sound via a first half of the speakers of the second zone which is the same sound as is output by a second half of the speakers of the second zone and is delayed from the sound output by the second half of the speakers of the second zone by one-half wavelength.

3. The method of claim 1, further comprising determining whether the auxiliary carrier is in the vehicle, is transitioning into or out of the vehicle, or is out of the vehicle, and in response to the auxiliary carrier being positioned out of the vehicle, detecting the environmental sound level using a microphone array of the auxiliary carrier and outputting sound via the speaker array of the auxiliary carrier to at least partially reduce the environmental sound level to less than a third sound level threshold.

4. The method of claim 3, further comprising halting output of sound via the speaker array of the auxiliary carrier when the auxiliary carrier is transitioning into the vehicle.

5. The method of claim 3, wherein determining whether the auxiliary carrier is transitioning into or out of the vehicle includes comparing a location of the auxiliary carrier to a position of the vehicle.

6. The method of claim 1, further comprising halting output of sound via speakers of the second zone of the vehicle when the auxiliary carrier is transitioning out of the vehicle.

7. The method of claim 6, further comprising detecting the environmental sound level using a microphone array of the auxiliary carrier and outputting sound via the speaker array of the auxiliary carrier to at least partially reduce the environmental sound level to less than a fourth sound level threshold.

8. The method of claim 1, further comprising:
detecting a zone of the vehicle in which the auxiliary carrier is positioned;
in response to the auxiliary carrier being positioned in the first zone, detecting the environmental sound level using a microphone array of the auxiliary carrier and outputting sound via the speaker array of the auxiliary carrier to at least partially reduce the environmental sound level; and,
in response to the auxiliary carrier being positioned in the second zone, detecting the environmental sound level using a commanded volume output level of the speakers of the zone.

9. A method for a vehicle system, comprising:
detecting a presence of a user in a vehicle;
detecting an age of the user;
detecting a zone of the vehicle in which the user is positioned;
detecting an environmental sound level within the zone of the vehicle in which the user is positioned; and
in response to the environmental sound level within the zone of the vehicle exceeding a sound level threshold when the user is in the zone of the vehicle, outputting sound via speakers of the zone to reduce the environmental sound level to at least a first level when the age of the user is within a first age range, and to reduce the environmental sound level to at least a second level when the age of the user is within a second age range, different from the first age range.

10. The method of claim 9, wherein the presence of the user is detected using one or more of a camera, a pressure sensor, and/or an attachment sensor of the vehicle.

11. The method of claim 9, wherein the zone of the vehicle in which the user is positioned is detected using one or more of a camera, a pressure sensor, and/or an attachment sensor of the vehicle.

12. The method of claim 9, wherein detecting the environmental sound level within the zone of the vehicle in which the user is positioned includes detecting a volume of sound output by speakers of the zone.

13. The method of claim 9, wherein outputting sound via speakers of the zone includes outputting sound from approximately half of the speakers of the zone.

14. The method of claim 9, further comprising:
detecting whether the user is positioned in an auxiliary carrier having a microphone array and a speaker array configured to output sound to at least partially reduce the environmental sound level;
in response to the user being positioned in the auxiliary carrier, determining if one or more speakers of the zone are shared with another zone of the vehicle;
in response to one or more speakers of the zone being shared with another zone of the vehicle, halting sound output by speakers of the zone and outputting sound via speakers of the auxiliary carrier to at least partially reduce the environmental sound level.

15. A system for an auxiliary carrier, comprising:
a location sensor selectively coupled to the auxiliary carrier and configured to detect a position of the auxiliary carrier with respect to a vehicle;
a user sensor configured to detect a presence of a user in the auxiliary carrier;
a microphone array configured to receive a sound input;
a speaker array configured to output sound in a direction towards the auxiliary carrier; and
a controller with computer-readable instructions that, when executed, cause the controller to identify a position of the auxiliary carrier with respect to the vehicle via the location sensor, identify the presence of the user in the auxiliary carrier, and, in response to the auxiliary carrier being positioned in the vehicle and the presence of the user in the auxiliary carrier being detected, detect the sound input via the microphone array and output sound, via the speaker array, to at least partially reduce a volume level of the sound input.

16. The system for the auxiliary carrier of claim 15, wherein the location sensor is further configured to detect a zone of the vehicle in which the auxiliary carrier is positioned.

17. The system for the auxiliary carrier of claim 15, wherein the user sensor is further configured to detect an age of the user.

18. The system for the auxiliary carrier of claim 17, wherein the controller is further configured to, in response to the age of the user being in a first range, output sound to reduce the volume level of the sound input to a first level and, in response to the age of the user being in a second range, output sound to reduce the volume level of the sound input to a second level different from the first level.

19. The system for the auxiliary carrier of claim 15, wherein the controller is further configured to:
identify the presence of the user in the auxiliary carrier and, in response to the auxiliary carrier being positioned outside of the vehicle and the presence of the user being detected, detect the sound input via the microphone array; and
in response to the sound input exceeding a sound level threshold, output sound via the speaker array to at least partially reduce the volume level of the sound input.

* * * * *